(12) United States Patent
Hall et al.

(10) Patent No.: US 11,277,305 B2
(45) Date of Patent: Mar. 15, 2022

(54) EDGE DISCOVERY TECHNIQUES IN WIRELESS COMMUNICATIONS SYSTEMS

(71) Applicant: QUALCOMM Incorporated, San Diego, CA (US)

(72) Inventors: Edward Robert Hall, Bristol (GB); Mahmoud Watfa, St-Leonard (CA); Alan Soloway, Erie, CO (US); Tom Chin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/064,450

(22) Filed: Oct. 6, 2020

(65) Prior Publication Data
US 2021/0111953 A1   Apr. 15, 2021

Related U.S. Application Data

(60) Provisional application No. 62/913,072, filed on Oct. 9, 2019.

(51) Int. Cl.
*H04L 12/24*   (2006.01)
*H04L 29/08*   (2006.01)
(Continued)

(52) U.S. Cl.
CPC .......... *H04L 41/0806* (2013.01); *H04L 41/12* (2013.01); *H04L 67/18* (2013.01); *H04L 67/32* (2013.01)

(58) Field of Classification Search
None
See application file for complete search history.

(56) References Cited

U.S. PATENT DOCUMENTS 7,533,184 B2 * 5/2009 Miller ............... H04L 29/12113
709/236
9,582,603 B1 * 2/2017 Acharya ................. H04L 67/42
(Continued)

FOREIGN PATENT DOCUMENTS

WO   WO-2019117793 A1   6/2019

OTHER PUBLICATIONS

"3 Generation Partnership Project; Technical Specification Group Services and System Aspects; Study on application architecture for enabling Edge Applications; (Release 17)", 3GPP Standard; Technical Report; 3GPP TR 23.758, 3rd Generation Partnership Project (3GPP), Mobile Competence Centre, 650, Route Des Lucioles, F-06921, Sophia-Antipolis Cedex, France, No. V1.0.0, Sep. 12, 2019 (Sep. 12, 2019), pp. 1-78, XP051784519, Retrieved from the Internet: URL: https://ftp.3gpp.org/Specs/archive/23_series/23.758/23758-100.zip 23758-100.doc[ retrieved on Sep. 12, 2019] pp. 17,22—p. 23.

(Continued)

*Primary Examiner* — Scott B Christensen
(74) *Attorney, Agent, or Firm* — Holland & Hart, LLP

(57) ABSTRACT

Methods, systems, and devices for wireless communications are described that provide for configuration of edge data networks based on current and projected future locations of a user equipment (UE). The UE may provide one or more expected future locations based on routing information of the UE, a polygon associated with one or more current or future UE locations, a waypoint set of the UE, and the like. Based on the provided one or more future locations, the edge data network may provide to the UE one or more edge data network configurations for different UE locations. As the UE moves to different locations, different edge data network configurations may be used, thereby enhancing efficiency of UE operation in the edge data network.

56 Claims, 19 Drawing Sheets

(51) Int. Cl.
    *H04L 41/0806* (2022.01)
    *H04L 67/60* (2022.01)
    *H04L 41/12* (2022.01)
    *H04L 67/52* (2022.01)

(56) References Cited

U.S. PATENT DOCUMENTS

| | | | |
|---|---|---|---|
| 10,277,669 B1* | 4/2019 | Joliveau | H04L 65/4084 |
| 2014/0207912 A1* | 7/2014 | Thibeault | H04L 67/2847 |
| | | | 709/219 |
| 2014/0378141 A1* | 12/2014 | Walley | H04W 36/023 |
| | | | 455/437 |
| 2018/0041984 A1* | 2/2018 | Li | H04W 64/00 |
| 2018/0150225 A1* | 5/2018 | Chang | G06F 3/0679 |
| 2018/0278688 A1* | 9/2018 | Gal | H04L 67/32 |
| 2019/0220210 A1* | 7/2019 | Bernat | G06F 12/0292 |
| 2020/0228623 A1* | 7/2020 | Weissman | H04W 36/14 |

OTHER PUBLICATIONS

International Search Report and Written Opinion—PCT/US2020/054635—ISA/EPO—dated Feb. 8, 2020 (195613WO).

\* cited by examiner

EDGE DISCOVERY TECHNIQUES IN WIRELESS COMMUNICATIONS SYSTEMS

CROSS REFERENCE

The present application for patent claims the benefit of U.S. Provisional Patent Application No. 62/913,072 by HALL et al., entitled "EDGE DISCOVERY TECHNIQUES IN WIRELESS COMMUNICATIONS SYSTEMS," filed Oct. 9, 2019, assigned to the assignee hereof, and expressly incorporated by reference herein.

BACKGROUND

The following relates generally to wireless communications, and more specifically to edge discovery techniques in wireless communications systems.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some deployments, an edge data network (EDN) may provide processing assistance to another network device. In such cases, a client device, such as a UE, may communicate certain application data to an edge application server on the EDN, and the edge application server may perform processing on the received data and provide responsive application data back to the client device. Such EDN processes may allow the client device to offload certain processing overhead (e.g., computationally intensive operations) that may allow the client device to use processing resources on other tasks, reduce power consumption, and the like. Techniques for efficient use of EDNs in conjunction with a wireless communications system may be desirable to provide processing support to UEs or other client devices of a wireless communications system.

SUMMARY

The described techniques relate to improved methods, systems, devices, and apparatuses that support edge discovery techniques in wireless communications systems. In various aspects, described techniques provide for configuration of edge data networks based on current and projected future locations of an edge data network client, such as a user equipment (UE) operating in a wireless communications system. In some cases, a UE may be moving relative to base stations within a wireless communications system, such that the UE may be served by different base stations that may be associated with different edge network servers (e.g., different edge application servers, edge enabler servers, edge data network configuration servers, or combinations thereof). Such a UE, in some cases, may have information that indicates a route or future expected location of the UE. The UE may provide one or more expected future locations to the edge data network, and receive one or more edge data network configurations that provide edge data network configurations for two or more different UE locations. As the UE moves to different locations, different edge data network configurations may be used, thereby enhancing efficiency of UE operation in the edge data network.

A method of wireless communication at a UE is described. The method may include transmitting, via a wireless communications network to an edge server of an edge data network, a request for edge information (e.g., a request for edge data network information or a request for edge application server information), the request including at least a first indication of a first geographical area in which the UE is currently located and a second indication of a second geographical area in which the UE is expected to be located in the future and receiving, from the edge server, a response that provides a set of edge data network configurations and, for each edge data network configuration, an associated geographical area of operation for the edge data network configuration.

An apparatus for wireless communication at a UE is described. The apparatus may include a processor, memory coupled with the processor, and instructions stored in the memory. The instructions may be executable by the processor to cause the apparatus to transmit, via a wireless communications network to an edge server of an edge data network, a request for edge information (e.g., a request for edge data network information or a request for edge application server information), the request including at least a first indication of a first geographical area in which the UE is currently located and a second indication of a second geographical area in which the UE is expected to be located in the future and receive, from the edge server, a response that provides a set of edge data network configurations and, for each edge data network configuration, an associated geographical area of operation for the edge data network configuration.

Another apparatus for wireless communication at a UE is described. The apparatus may include means for transmitting, via a wireless communications network to an edge server of an edge data network, a request for edge information (e.g., a request for edge data network information or a request for edge application server information), the request including at least a first indication of a first geographical area in which the UE is currently located and a second indication of a second geographical area in which the UE is expected to be located in the future and receiving, from the edge server, a response that provides a set of edge data network configurations and, for each edge data network configuration, an associated geographical area of operation for the edge data network configuration.

A non-transitory computer-readable medium storing code for wireless communication at a UE is described. The code may include instructions executable by a processor to transmit, via a wireless communications network to an edge server of an edge data network, a request for edge information (e.g., a request for edge data network information or a request for edge application server information), the request including at least a first indication of a first geographical area in which the UE is currently located and a second indication of a second geographical area in which the UE is expected to be located in the future and receive, from the edge server, a response that provides a set of edge data network configurations and, for each edge data network configuration, an associated geographical area of operation for the edge data network configuration.

In some examples of the method, apparatuses, and non-transitory computer-readable medium described herein, the first indication of the first geographical area and the second indication of the second geographical area may be both included in a same request message. In some examples of the method, apparatuses, and non-transitory computer-readable medium described herein, the request for edge information includes a first request message and a second request message, and where the first request message includes the first indication of the first geographical area and the second request message includes the second indication of the second geographical area. In some examples of the method, apparatuses, and non-transitory computer-readable medium described herein, the set of edge data network configurations includes connection information for a set of edge data network configuration servers including one or more of a first edge data network configuration server associated with the first geographic area, or a second edge data network configuration servers associated with the second geographic area.

Some examples of the method, apparatuses, and non-transitory computer-readable medium described herein may further include operations, features, means, or instructions for communicating with the first edge data network configuration server in the first geographical area, determining that the UE has moved to the second geographical area, and communicating, responsive to the determining, with the second edge data network configuration server. In some examples of the method, apparatuses, and non-transitory computer-readable medium described herein, the set of edge data network configurations includes information for a set of edge application server instances including one or more of a first edge application server instance associated with the first geographic area, or a second edge application server instance associated with the second geographic area. Some examples of the method, apparatuses, and non-transitory computer-readable medium described herein may further include operations, features, means, or instructions for communicating with the first edge application server instance in the first geographical area, determining that the UE has moved to the second geographical area, and communicating, responsive to the determining, with the second edge application server instance. In some examples of the method, apparatuses, and non-transitory computer-readable medium described herein, the expected future location of the UE may be based on one or more of a geographic point, a polygon associated with the UE location, a configured route of the UE, a signaling map of the UE, a waypoint set of the UE, or any combinations thereof.

In some examples of the method, apparatuses, and non-transitory computer-readable medium described herein, the request for the edge data network information includes a set of information elements, including at least a first information element for a geographical area of operation that indicates one or more geographical areas. In some examples of the method, apparatuses, and non-transitory computer-readable medium described herein, the geographical area of operation of each of the edge data network configuration may be provided as one or more of a geographic point, a polygon, a portion of a configured route of the UE, a portion of a signaling map of the UE, a waypoint of a waypoint set of the UE, or any combinations thereof.

In some examples of the method, apparatuses, and non-transitory computer-readable medium described herein, the edge server may be part of a base station of the wireless communications network. In some examples of the method, apparatuses, and non-transitory computer-readable medium described herein, the request may be generated at an edge enabler client at the UE and transmitted to an edge data network configuration server via an EDGE-4 interface provided by the wireless communications network, and the response may be received at the edge enabler client from the edge data network configuration server via the EDGE-4 interface. In some examples of the method, apparatuses, and non-transitory computer-readable medium described herein, the request may be generated at an edge enabler client at the UE and transmitted to an edge enabler server via an EDGE-1 interface provided by the wireless communications network, and the response may be received at the edge enabler client from the edge enabler server via the EDGE-1 interface.

A method of wireless communication at a network node of an edge data network is described. The method may include receiving, from a UE via a wireless communications network, a request for edge information (e.g., a request for edge data network information or a request for edge application server information), the request including at least a first indication of a first geographical area in which the UE is currently located and a second indication of a second geographical area in which the UE is expected to be located in the future and transmitting, to the UE, a response that provides a set of edge data network configurations and, for each edge data network configuration, an associated geographical area of operation for the edge data network configuration.

An apparatus for wireless communication at a network node of an edge data network is described. The apparatus may include a processor, memory coupled with the processor, and instructions stored in the memory. The instructions may be executable by the processor to cause the apparatus to receive, from a UE via a wireless communications network, a request for edge information (e.g., a request for edge data network information or a request for edge application server information), the request including at least a first indication of a first geographical area in which the UE is currently located and a second indication of a second geographical area in which the UE is expected to be located in the future and transmit, to the UE, a response that provides a set of edge data network configurations and, for each edge data network configuration, an associated geographical area of operation for the edge data network configuration.

Another apparatus for wireless communication at a network node of an edge data network is described. The apparatus may include means for receiving, from a UE via a wireless communications network, a request for edge information (e.g., a request for edge data network information or a request for edge application server information), the request including at least a first indication of a first geographical area in which the UE is currently located and a second indication of a second geographical area in which the UE is expected to be located in the future and transmitting, to the UE, a response that provides a set of edge data network configurations and, for each edge data network configuration, an associated geographical area of operation for the edge data network configuration.

A non-transitory computer-readable medium storing code for wireless communication at a network node of an edge data network is described. The code may include instructions executable by a processor to receive, from a UE via a wireless communications network, a request for edge information (e.g., a request for edge data network information or a request for edge application server information), the request including at least a first indication of a first geographical area in which the UE is currently located and a second indication of a second geographical area in which the UE is expected to be located in the future and transmit, to the UE, a response that provides a set of edge data network configurations and, for each edge data network configuration, an associated geographical area of operation for the edge data network configuration.

In some examples of the method, apparatuses, and non-transitory computer-readable medium described herein, the first indication of the first geographical area and the second indication of the second geographical area are both included in a same request message. In some examples of the method, apparatuses, and non-transitory computer-readable medium described herein, the request for edge information includes a first request message and a second request message, and where the first request message includes the first indication of the first geographical area and the second request message includes the second indication of the second geographical area.

In some examples of the method, apparatuses, and non-transitory computer-readable medium described herein, the set of edge data network configurations includes connection information for a set of edge data network configuration servers including one or more of a first edge data network configuration server associated with the first geographic area, or a second edge data network configuration servers associated with the second geographic area. Some examples of the method, apparatuses, and non-transitory computer-readable medium described herein may further include operations, features, means, or instructions for configuring the first edge data network configuration server and the second edge data network configuration server with context information of the UE.

In some examples of the method, apparatuses, and non-transitory computer-readable medium described herein, the set of edge data network configurations includes information for a set of edge application server instances including one or more of a first edge application server instance associated with the first geographic area, or a second edge application server instance associated with the second geographic area. Some examples of the method, apparatuses, and non-transitory computer-readable medium described herein may further include operations, features, means, or instructions for configuring one or more of a first edge application server to provide the first edge application server instance for the UE, or a second edge application server to provide the second edge application server instance for the UE. In some examples of the method, apparatuses, and non-transitory computer-readable medium described herein, the expected future location of the UE may be based on one or more of a geographic point, a polygon associated with the UE location, a configured route of the UE, a signaling map of the UE, a waypoint set of the UE, or any combinations thereof.

In some examples of the method, apparatuses, and non-transitory computer-readable medium described herein, the request for network information includes a set of information elements, including at least a first information element for a geographical area of operation that indicates the one or more geographical areas. In some examples of the method, apparatuses, and non-transitory computer-readable medium described herein, the geographical area of operation of each of the edge data network configuration may be provided as one or more of a geographic point, a polygon, a portion of a configured route of the UE, a portion of a signaling map of the UE, a waypoint of a waypoint set of the UE, or any combinations thereof.

In some examples of the method, apparatuses, and non-transitory computer-readable medium described herein, the network node may be part of a base station of the wireless communications network. In some examples of the method, apparatuses, and non-transitory computer-readable medium described herein, the request may be generated at an edge enabler client at the UE and received at an edge data network configuration server via an EDGE-4 interface provided by the wireless communications network, and the response may be transmitted to the edge enabler client from the edge data network configuration server via the EDGE-4 interface. In some examples of the method, apparatuses, and non-transitory computer-readable medium described herein, the request may be generated at an edge enabler client at the UE and received at an edge enabler server via an EDGE-1 interface provided by the wireless communications network, and the response may be transmitted to the edge enabler client from the edge enabler server via the EDGE-1 interface.

DETAILED DESCRIPTION

Figure 1:
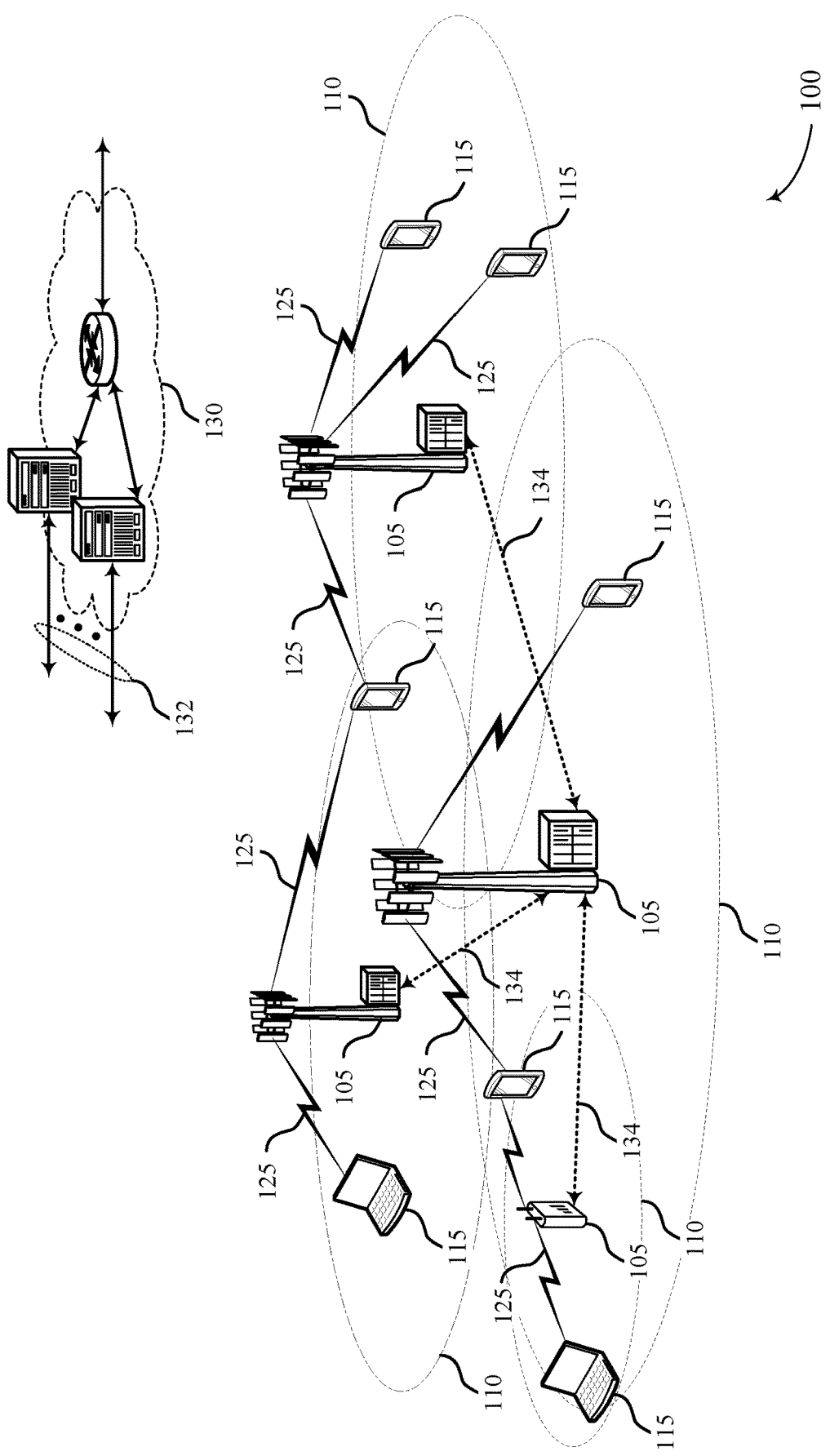
FIG. 1 illustrates an example of a system for wireless communications that supports edge discovery techniques in wireless communications systems in accordance with aspects of the present disclosure.

Various aspects of the present disclosure provide for an edge data network (EDN) that may provide configuration information for multiple locations of a user equipment (UE) in a wireless communications system. In some cases, the UE may have information related to a current UE location, as well as one or more expected future locations. As the UE moves from one location to another, different base stations may serve the UE, with such different base stations, in some cases, being located relatively far away from an edge application server that is providing processing support to the UE. In cases where an edge application server is located relatively far from the UE, latency associated with application data traffic between the UE and edge application server may be increased, which may reduce overall network efficiency. For example, the UE may be associated with a vehicle (e.g., an automobile traveling along a determined route) or an aircraft (e.g., an unmanned aerial vehicle (UAV) that travels to predetermined waypoints) that moves between coverage areas of different base stations relatively quickly. As different base stations have different latency for communications with a same edge application server instance, latency for application data traffic exchanged between the UE and the edge application server may change. In some cases, the edge data network may provide multiple configurations to a UE based on the current location of the UE and one or more future locations of the UE, which may reduce latency for application clients at the UE as the UE changes serving base stations.

Various described techniques provide for configuration of edge data networks based on current and projected future locations of such a UE. In some cases, the UE may provide expected future locations based on routing information of the UE, a polygon associated with one or more current or future UE locations, a waypoint set of the UE, or any combinations thereof, to name but a few examples. The UE, after providing the one or more expected future locations to the edge data network, may receive one or more edge data network configurations that provide edge data network configurations for two or more different UE locations. As the UE moves to different locations, different edge data network configurations may be used, thereby enhancing efficiency of UE operation in the edge data network.

In some cases, an edge enabler client at a UE may transmit a request for edge information (e.g., a request for edge data network information or a request for edge application server information) to the edge data network (e.g., to an edge data network configuration server, which in some examples may also be referred to as an edge configuration server, or an edge enabler server). The request may include a first indication of a first geographical area in which the UE is currently located and, in some cases, a second indication of a second geographical area in which the UE is expected to be located in the future. In other cases, the first indication may be provided in a first request message, and the second indication may be provided in a second request message. The UE may then receive, from the edge data network, one or more responses that provide a set of edge data network configurations and, for each edge data network configuration, an associated geographical area of operation for the edge data network configuration. As the UE moves to different geographical areas, the corresponding edge data network configuration may be selected such that efficient edge data network services may be provided.

In some cases, the request from the UE may be transmitted to an edge data network configuration server (e.g., via an EDGE-4 interface), and the set of edge data network configurations includes connection information for a number of different edge data network configuration servers associated with the different geographic areas, and the UE may communicate with the first edge data network configuration server in the first geographical area, determine that the UE has moved to the second geographical area, and communicate with the second edge data network configuration server based on the movement to the second geographical area.

In other cases, the request from the UE may be transmitted to an edge enabler server at the edge data network (e.g., via an EDGE-1 interface), and the set of edge data network configurations may include information for a number of different edge application server instances corresponding to the different geographical area, and the UE may communicate with the edge application server instance that corresponds to the appropriate geographical area of the UE, and switch to different edge application server instances based on UE movement.

Such techniques may allow for efficient processing support that is provided by an edge data network with relatively low latency as a UE moves between coverage areas of base stations within a wireless communications network. By providing multiple configurations based on expected UE locations, latency increases associated with application data traffic being exchanged with an edge application server instance located away from a serving base station may be reduced. Further, by providing a set of edge data network configurations prior to the UE moving between expected locations, latency associated with a new edge data network discovery and configuration may also be reduced, further enhancing efficiency for application clients at a UE that receive processing support from one or more edge application server instances. In some examples, one or more integrated circuits (e.g., transceivers, processors, etc.) of a UE may implement the efficient processing techniques discussed herein to reduce overall power consumption for the UE.

Aspects of the disclosure are initially described in the context of a wireless communications system. Examples of UE movement and edge data network configurations based on UE movement are then described for various examples. Aspects of the disclosure are further illustrated by and described with reference to apparatus diagrams, system diagrams, and flowcharts that relate to edge discovery techniques in wireless communications systems.

FIG. 1 illustrates an example of a wireless communications system 100 that supports edge discovery techniques in wireless communications systems in accordance with aspects of the present disclosure. The wireless communications system 100 includes base stations 105, UEs 115, and a core network 130. In some cases, as discussed with reference to FIGS. 2 through 5, an edge data network may be deployed in conjunction with wireless communications system 100, in which one or more edge data network components may be co-located with one or more core network 130 components, one or more base stations 105, or combinations thereof. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, an edge data network may be deployed in conjunction with wireless communications system 100, and UEs 115 may be configured with one or more edge data network configurations based on a current and one or more projected future locations. In some cases, a UE 115 may provide expected future locations based on routing information of the UE 115, a polygon associated with one or more current or future UE 115 locations, a waypoint set of the UE 115, or any combinations thereof, to name but a few examples. The UE 115, after providing the one or more expected future locations to the edge data network, may receive one or more edge data network configurations for two or more different UE locations. As the UE moves to different locations, different edge data network configurations may be used, thereby enhancing efficiency of UE operation in the edge data network.

Figure 2:
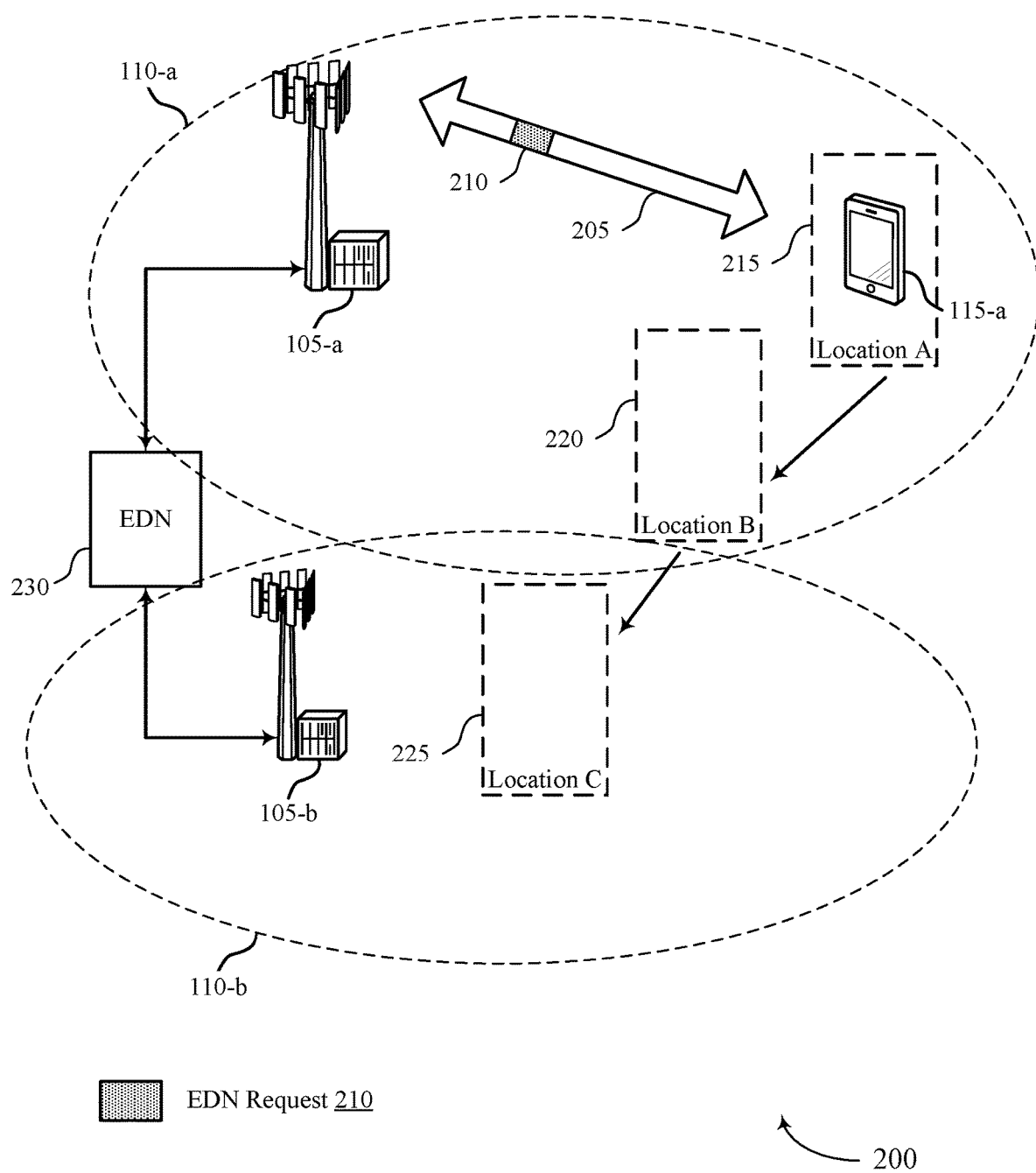
FIG. 2 illustrates an example of a portion of a wireless communications system that supports edge discovery techniques in wireless communications systems in accordance with aspects of the present disclosure.

FIG. 2 illustrates an example of a wireless communications system 200 that supports edge discovery techniques in wireless communications systems in accordance with aspects of the present disclosure. In some examples, wireless communications system 200 may implement aspects of wireless communications system 100. In some examples, the wireless communications system 200 may include a UE 115-a, a first base station 105-a, and a second base station 105-b which may be examples of UEs 115 and base stations 105 described with reference to FIG. 1. The UE 115-a may communicate with the first base station 105-a via an access link 205, which the UE 115-a may use to transmit one or more edge data network requests 210.

In this example, the UE 115-a may initially be in a first location 215 (Location A). In some cases, the UE 115-a may have information about its expected future locations, which in this example may include a second location 220 (Location B) and a third location 225 (Location C). In some cases, the expected future locations of the UE 115-a may be determined based on information available to the UE 115-a, such as routing information from a routing application of the UE 115-a (e.g., routing information for a vehicle that is travelling along a roadway or series of roadways between a starting location and a destination location), waypoint information (e.g., a set of predetermined geographical positions used for navigation), a polygon with vertices associated with an expected location, a signaling map (e.g., a set of wireless nodes that are expected to be used for providing signaling to the UE 115-a), a set of geographic points, or any other information that may be used to indicate expected positioning of the UE 115-a.

In this example, an edge data network 230 may have components or network nodes that are in communication with each of the first base station 105-a and the second base station 105-b. In some cases, the edge data network 230 may have one or more servers, such as an edge data network configuration server, an edge enabler server, an edge application server, or combinations thereof, that are co-located with base stations 105. For example, a first edge application server may be co-located, or located in close proximity, with the first base station 105-a, and a second edge application server may be co-located, or located in close proximity, to the second base station 105-b. In such cases, the UE 115-a, when located at the first location 215-a, may be served by a first edge application server instance at the first edge application server that is associated with the first base station 105-a. Further, if the UE 115-a is at the third location 225, which in this example is in a second coverage area 110-b of the second base station 105-a, the first edge application server instance at the first base station 105-a may have a relatively large amount of latency for communicating application data traffic.

In accordance with various aspects of the present disclosure, the edge data network 230, in response to the edge data network request 210, may provide configuration information that allows the UE 115-a to exchange application data traffic with the second edge application server instance at the second base station 105-b. In some cases, the edge data network request 210 may include location information associated with the first location 215. The edge data network request 210 may also include location information associated with one or more of the second location 220 or third location 225. In some cases, information associated with each of the first through third locations 215-225 may be included in a single request message. In other cases, the edge data network request 210 may include multiple request messages, and information for the first location 215 may be provided in a first request message, information for the second location 220 may be provided in a second request message, and so on. In response to the edge data network request 210, the edge data network 230 may provide one or more responses with edge data network configuration associated with the different UE 115-a locations.

In some cases, the edge data network request 210 may include a number of information elements that provide information related to the UE 115-a, location information of the UE 115-a, and other relevant information that may be used to provision edge data network resources to support the UE 115-a (e.g., a UE 115-a identification, requested services, application client types, a schedule of communications, quality of service information, or combinations thereof). Examples of information provided in edge data network requests 210 is described in further detail with reference to FIG. 3. In some cases, one or more information elements of the edge data network request 210 may be modified to allow a route, list of waypoints, or other expected location information, to be provided in the edge data network request 210. As a result, in some cases, an edge data network configuration server may return a list of edge data networks and edge enabler servers which would serve the provided route. Additionally or alternatively, an edge enabler server may return a list of edge application servers which would serve the provided route.

Figure 3:
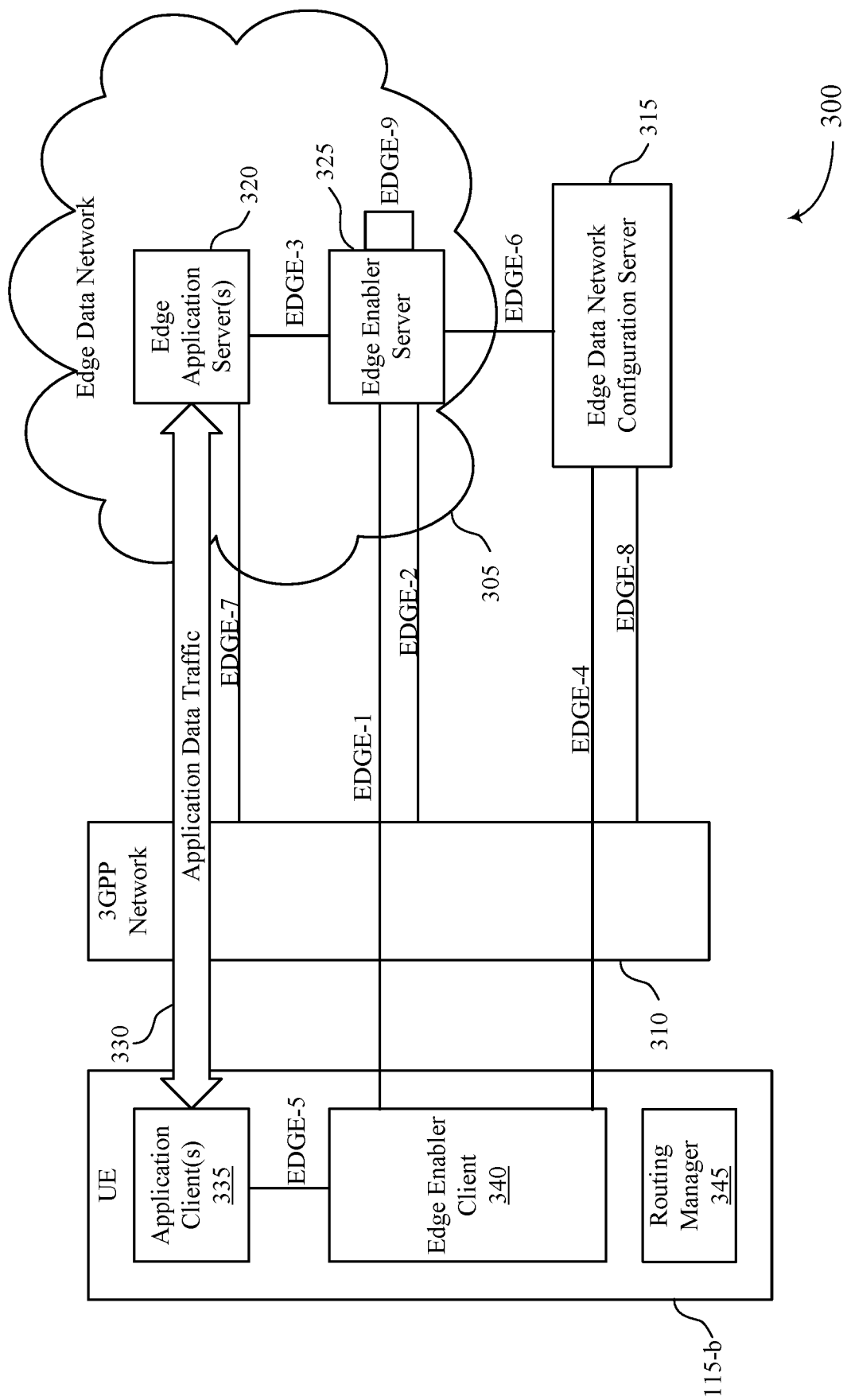
FIG. 3 illustrates an example of an edge data network that supports edge discovery techniques in wireless communications systems in accordance with aspects of the present disclosure.

FIG. 3 illustrates an example of an edge data network 300 that supports edge discovery techniques in wireless communications systems in accordance with aspects of the present disclosure. In some examples, edge data network 300 may implement aspects of wireless communications system 100 or 200. In this example, a UE 115-b may communicate, via a wireless network 310 (e.g., a 3GPP network such as a NR network), with an edge data network 305.

In the example of FIG. 3, an edge data network configuration server 315, which in some examples may also be referred to as an edge configuration server, may communicate with an edge enabler client 340 at the UE 115-b, via an EDGE-4 interface. In some cases, a number of EDGE interfaces (e.g., EDGE-1 through EDGE-9 interfaces) may be defined that provide for communications protocols between different edge-related entities. The edge enabler client 340 at the UE 115-b may manage requests and configurations for exchanging application data traffic 330 between one or more application clients 335 at the UE 115-b and one or more edge application servers 320, which may also be referred to as edge application server instances, that may provide processing resources for the UE 115-b. The edge enabler client 340 at the UE 115-b may also communicate with an edge enabler server 325 at the edge data network 305 via an EDGE-1 interface. The edge enabler client 340 may perform discovery functions to discover available edge data networks 305 and establish one or more connections for application data traffic 330.

Discovery functions may include discovery of edge data networks 305 and edge enabler servers (e.g., via the EDGE-4 interface). The discovery process may include a request that is sent by the edge enabler client 340. The discovery request may include a provisioning request, with information elements as indicated in the example of Table 1, that contain query filters to retrieve information about a particular edge application server or a category of edge application servers (e.g., for gaming applications). Query filters may also indicate a desired level of access permissions, desired features (e.g. multi-player or single player), and desired location availability. The request may also include the identities of application client(s) that may initiate application data traffic with the discovered edge application server(s). If no query filter is included, it may indicate a request to discover all available edge application servers. The discovery request may also include an application client profile, such as illustrated in Table 2. In some cases, the desired location availability may include the expected location(s) or route of the UE during the application's operation schedule, and may include a geographic information set that can express a geographic point, polygon, route, signaling map, waypoint set, or combinations thereof. In some cases, an information element related to the desired location availability may accommodate multiple locations for the UE location set. In other cases, different desired location availabilities may be provided separately in separate application client profile transmissions.

TABLE 1

Provisioning Request

| Information element | Status (Optional/Mandatory) | Description |
|---|---|---|
| UE Identifier | M | The identifier of the UE |
| Application Client Profile(s) | O | Information about what services the Edge Enabler Client wants to connect to. This information will be used by the Edge Data Network Configuration Server to filter its response. |
| Connectivity Filter | O | List of connectivity information for the UE. For example: PLMN ID, SSID (NOTE) |

NOTE:
The UE connectivity is only relevant in the deployment scenarios when the Edge Data Network Configuration Server is centralized for multiple Edge Data Networks.

TABLE 2

Application Client Profile

| Information element | Status | Description |
|---|---|---|
| ECSP Filter | O | The identity of Edge Computing Service Provider(s) that Edge Enabler Client is willing to connect to. If this field is present, the Edge Data Network Configuration Server may filter its response based on this preference. |
| Application Client Type | O | The category or type of Application Client (e.g. V2X) |
| Application Client Schedule | O | The expected operation schedule of the Application Client (e.g. time windows) |
| Application Client Service Area | O | The expected location(s) or route of the UE during the Application's operation schedule. This geographic information set can express a geographic point, polygon, route, signaling map, or waypoint set |
| Application Client Required KPIs (Key Performance Indicators) | O | The range of KPIs (e.g. latency and data rate) that are required in order for Application Clients to receive their desired services form the EAS. |

The edge enabler server 325, in response to the request and information, may format and transmit a response message to the UE 115-b. An example of a response message format is provided in Table 3. In this example, the response may include a list or set of suitable edge data networks covering different service areas associated with the different locations provided in the application client profile. In some cases, the edge enabler server 325 may retrieve the information of edge application servers 320. The information may include a list of fully qualified domain names (FQDNs) along with a mapping to the IP address(es) of the edge application servers 320 running on edge hosting platforms in the edge data network 305. For edge application servers 320 that are available but not instantiated, the edge enabler server 325 may include relevant information. Further, the edge enabler server may apply one or more discovery policies or filters, including filters received in the edge application server discovery request to the retrieved information, if any. In cases where additional access permissions may be specified in the query filters of the discovery request, the edge enabler server 325 may include additional information regarding the discovered edge application servers 320. For example, the edge enabler server 325 may indicate the access permissions, the types of features, and the application client locations(s) that the edge application servers 320 can support.

TABLE 3

Provisioning Response

| Information element | Status | Description |
| --- | --- | --- |
| EDN connection info | O | DNN (or APN), S-NSSAI, etc. |
| EDN Service Area | O | Cell list, List of TA, PLMN IDs |
| EES connection info | M | The endpoint address (e.g. URI) of Edge Enabler Server. |
| ECSP info | O | Information for Edge Computing Service Provider (see NOTE 1) |

NOTE 1:
This IE is present if the Edge Computing Service Provider is different than the PLMN operator that the UE is registered.
NOTE 2:
If the URSP is deployed in 5GC and used by the MNO, EDN connection Info may be provided to the UE using URSP.
NOTE 3:
the EDNCS may return a set of suitable EDN covering different Service Areas Discovery functions may also include discovery of edge application servers 320 (e.g., via the EDGE-1 interface). In such cases, the discovery process may include a request that is sent by the edge enabler client 340 to edge enabler server 325. The discovery request may include application client information in a number of information elements, such as illustrated in Table 4. In some cases, the geographical area of operation information element may include the expected locations of the UE 115-b. In other cases, two or more discovery requests may be transmitted, that are each associated with a different geographical area corresponding to the expected locations of the UE 115-b.

TABLE 4

Application Client Information

| Information element | Status | Description |
| --- | --- | --- |
| Application Client ID | M | ID of the Application Client |
| Application provider | O | Provider of the Application Client |
| Application description | O | Human-readable description of the application |
| Application Characteristics | O | Characteristics of the application. As defined below. |
| >Geographical area of operation | O | The geographical area(s) where the Application Client instance is located and/or expected to be located. |

TABLE 4-continued

Application Client Information

| Information element | Status | Description |
| --- | --- | --- |
|  |  | This geographic information set can express a geographic point, polygon, route, signalling map, or waypoint set |
| >Latency | O | The required round trip time in milliseconds for the application. |
| >Bandwidth | O | The required connection bandwidth in kbit/s for the application. |
| >Service continuity | O | Required service continuity mode for the application. |

In response to the EDGE-1 request with application client information, the edge enabler server 325 may determine a response based on edge application server(s) 320 that may be instantiated at locations that correspond to the current and expected UE 115-b locations. In some examples, the edge enabler server 325 may transmit information elements as illustrated in Table 5, that provide information for edge application server(s) 320 that may be instantiated and serve the provided route or expected UE 115-b locations. In some cases, a set of edge application server information messages may be provided for edge application server(s) 320, and may be associated with the UE 115-b current or expected locations.

TABLE 5

Edge Application Server Information

| Information element | Status | Description |
| --- | --- | --- |
| Edge Application Server instance Identifier | M | The identifier of the instance of the Edge Application Server instance |
| Edge Application Server instance name | O | Name of the instance of the Edge Application Server instance |
| Application instance description | O | Human-readable description of the application instance |
| URI of the application instance | M | Address of the Edge Application Server instance. |
| Geographical area of operation | O | The geographical area where the Edge Application Server instance is available |
| Time of operation | O | The operation time during which the Edge Application Server instance is available |
| Latency | O | The required round trip time in milliseconds for the application. |
| Bandwidth | O | The required connection bandwidth in kbit/s for the application. |
| Service continuity | O | Required service continuity mode for the application. |

Figure 4:
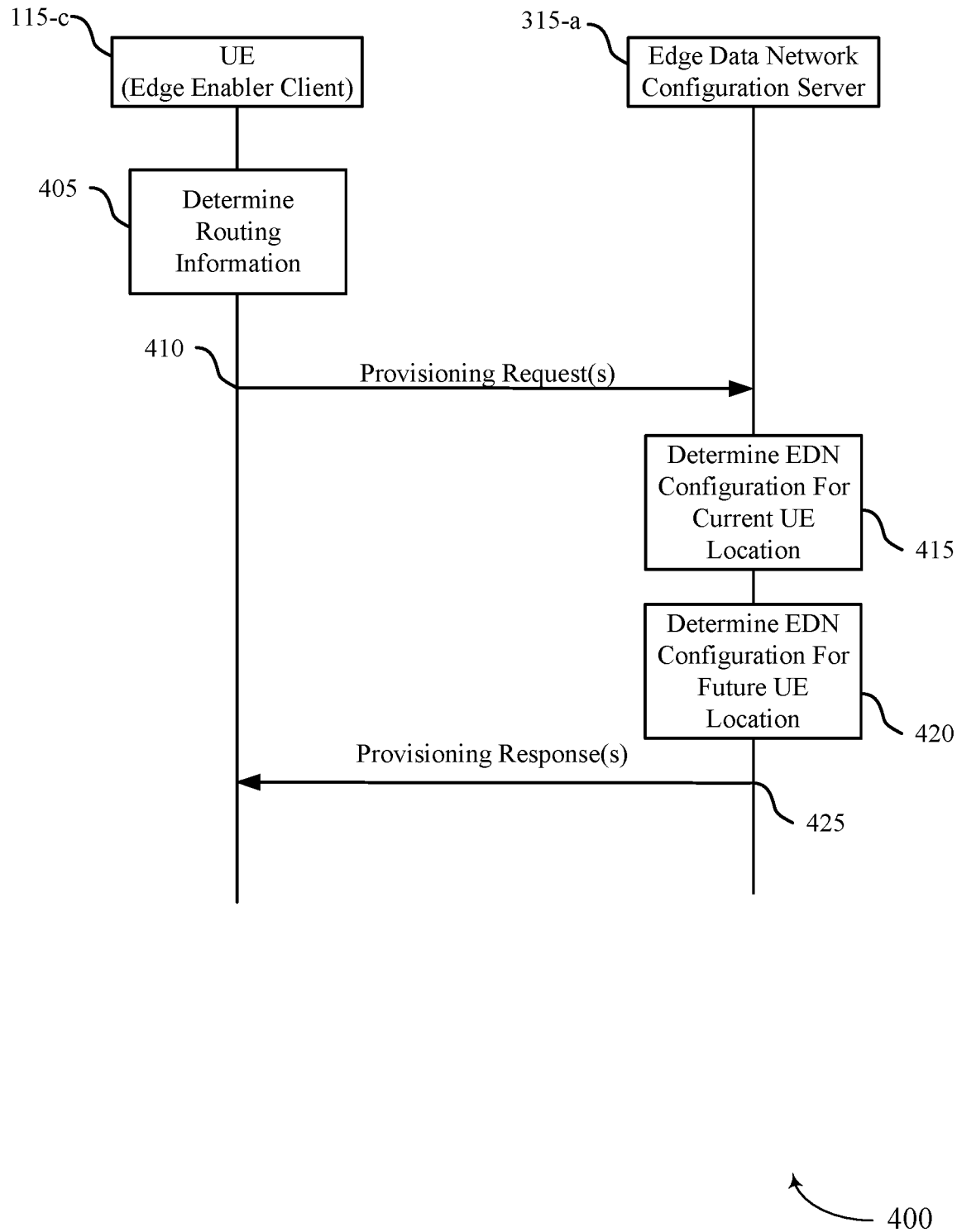
FIG. 4 illustrates an example of a process flow that supports edge discovery techniques in wireless communications systems in accordance with aspects of the present disclosure.

FIG. 4 illustrates an example of a process flow 400 that supports edge discovery techniques in wireless communications systems in accordance with aspects of the present disclosure. In some examples, process flow 400 may implement aspects of wireless communications system 100 or 200, or edge data network 300. Process flow 400 may be implemented by a UE 115-c, and an edge data network configuration server 315-a, which in some examples may also be referred to as an edge configuration server, or any other examples of UEs 115 or edge data network configuration servers 315 as described herein. Alternative examples of the following may be implemented, where some steps are performed in a different order than described or are not performed at all. In some cases, steps may include additional features not mentioned below, or further steps may be added.

At 405, the UE 115-c, such as an edge enabler client at the UE 115-c, may determine routing information. The routing information may be determined based on a routing application running at the UE 115-c, a set of waypoints programmed for UE 115-c navigation, a polygon associated with UE 115-c expected locations, a signaling map associated with the UE 115-c, or any other information associated with a future expected location of the UE.

At 410, the UE 115-c may transmit a provisioning request to the edge data network configuration server 315-a. The provisioning request may be transmitted via the EDGE-4 interface, for example, and may include a number of information elements such as described with reference to FIG. 3.

At 415, the edge data network configuration server 315-a may determine edge data network configuration information for a current location of the UE 115-c. At 420, the edge data network configuration server 315-a may determine edge data network configuration information for one or more future locations of the UE 115-c. The edge data network configuration server 315-a may determine the configuration information based on available edge data networks and edge data network configuration servers associated with the one or more future locations of the UE 115-c.

At 425, the edge data network configuration server 315-a may transmit one or more provisioning responses to the UE 115-c. In some cases, a single provisioning response may include information related to multiple different UE 115-c locations. In other cases, separate provisioning responses may be provided for each indicated UE 115-c location.

Figure 5:
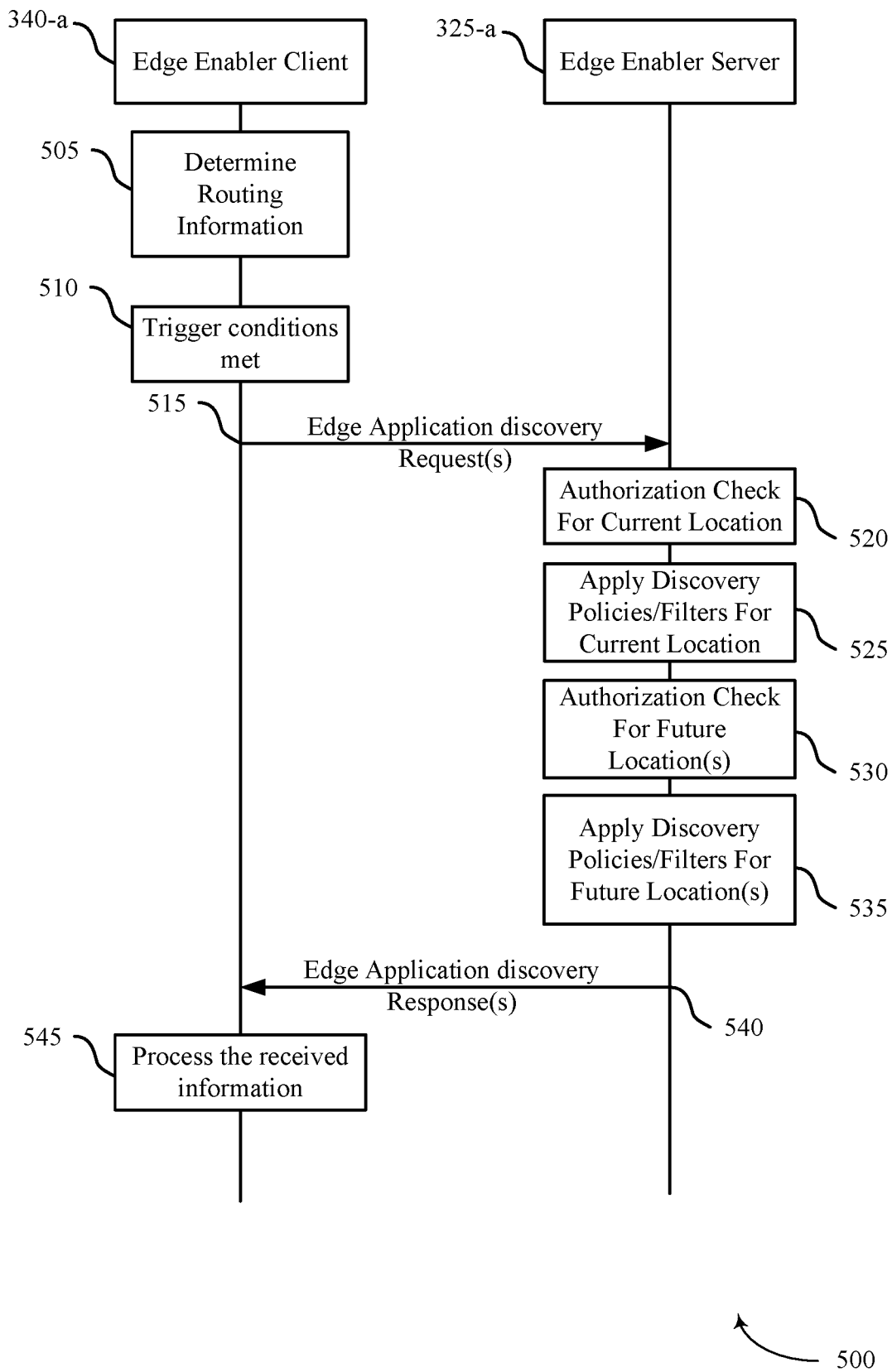
FIG. 5 illustrates an example of a process flow that supports edge discovery techniques in wireless communications systems in accordance with aspects of the present disclosure.

FIG. 5 illustrates an example of a process flow 500 that supports edge discovery techniques in wireless communications systems in accordance with aspects of the present disclosure. In some examples, process flow 500 may implement aspects of wireless communications system 100 or 200, or edge data network 300. Process flow 500 may be implemented by an edge enabler client 340-a (e.g., at a UE 115), and an edge enabler server 325-a, or any other examples of UEs 115 or edge enabler servers 325 as described herein. Alternative examples of the following may be implemented, where some steps are performed in a different order than described or are not performed at all. In some cases, steps may include additional features not mentioned below, or further steps may be added.

At 505, the edge enabler client 340-a, such as an edge enabler client at a UE, may determine routing information. The routing information may be provided to the edge enabler client 340-a by one or more other applications running at the UE (e.g., a routing manager 345 as illustrated in FIG. 3), and may include a set of waypoints, a polygon of expected locations, a signaling map, or any other information associated with a future expected location of the UE.

At 510, the edge enabler client 340-a may determine that trigger conditions are met for requesting an edge application server. Such trigger conditions may include, for example, connecting to the edge enabler sever 325-a for the first time, expiry of a periodic timer, entering or exiting a geographic area, or any combinations thereof.

At 515, the edge enabler client 340-a may transmit one or more edge application discovery requests to the edge enabler server 325-a. The edge application discovery request(s) may be transmitted via the EDGE-1 interface, for example, and may include a number of information elements such as described with reference to FIG. 3.

At 520, the edge enabler server 325-a may perform an authorization check for the current UE location. Such an authorization check may include confirming that the edge enabler client 340-a has credentials for application server access, confirming that the edge enabler client 340-a has access permissions, confirming location of the edge enabler client 340-a, or any combinations thereof.

At 525, the edge enabler server 325-a may apply discovery policies and filters for the current location of the edge enabler client 340-a. Such policies and filters may include, for example, additional access permissions specified in query filters of the discovery request, additional information regarding the discovered edge application servers, types of features of the edge application servers, or any combinations thereof.

At 530, the edge enabler server 325-a may perform an authorization check for one or more future UE location(s). At 535, the edge enabler server 325-a may apply discovery policies and filters for the future location(s) of the edge enabler client 340-a.

At 540, the edge enabler server 325-a may transmit one or more edge application discovery responses to the edge enabler client 340-a. The edge application discovery response(s) may be transmitted via the EDGE-1 interface, for example, and may include a number of information elements such as described with reference to FIG. 3. At 545, the edge enabler client 340-a may process the received information and prepare one or more application clients to exchange application data with one or more instantiated edge application server(s).

Figure 6:
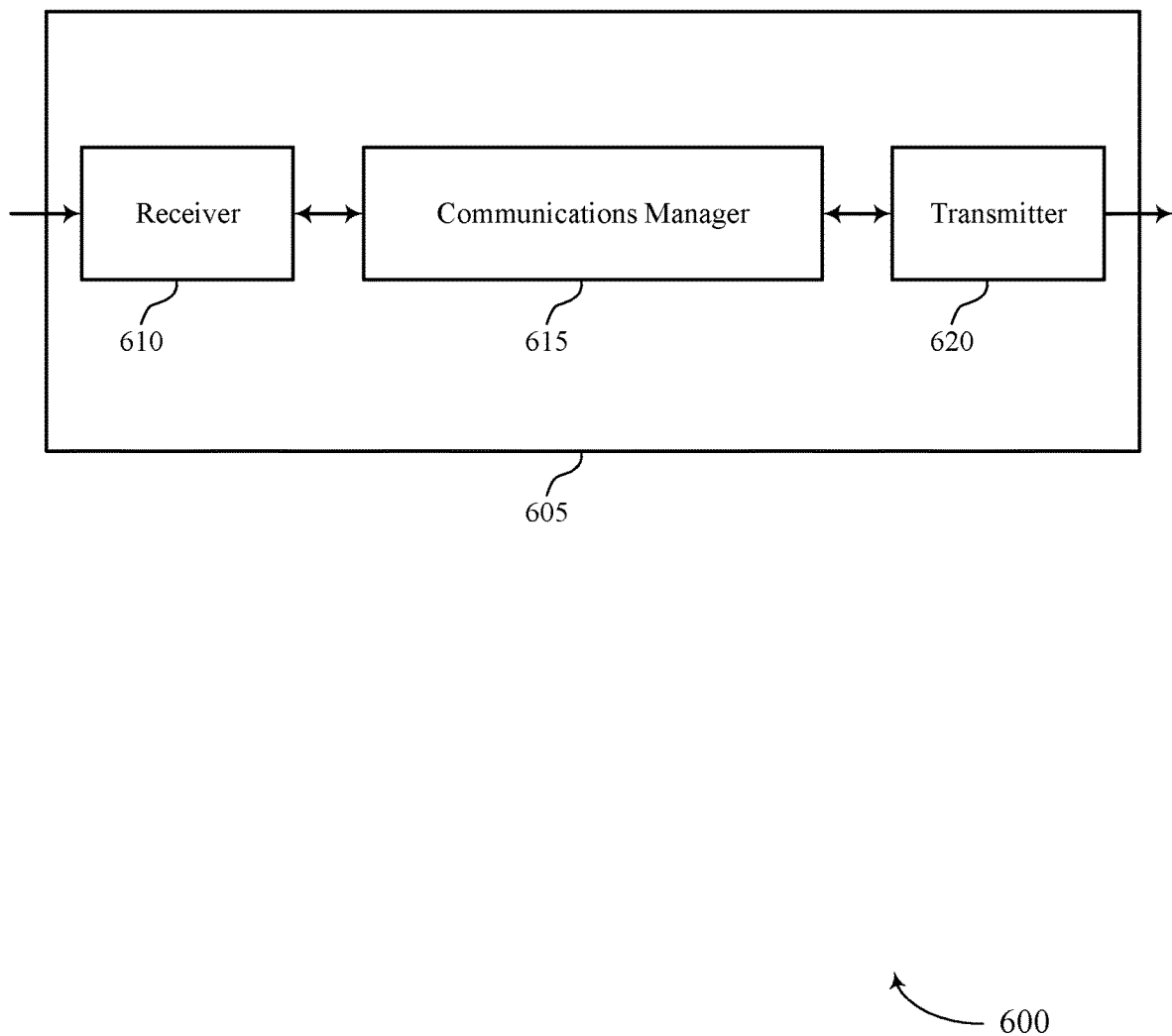
FIGS. 6 and 7 show block diagrams of devices that support edge discovery techniques in wireless communications systems in accordance with aspects of the present disclosure.

FIG. 6 shows a block diagram 600 of a device 605 that supports edge discovery techniques in wireless communications systems in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to edge discovery techniques in wireless communications systems, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may transmit, via a wireless communications network to an edge server of an edge data network, a request for edge information (e.g., a request for edge data network information or a request for edge application server information), the request including at least a first indication of a first geographical area in which the UE is currently located and a second indication of a second geographical area in which the UE is expected to be located in the future and receive, from the edge server, a response that provides a set of edge data network configurations and, for each edge data network configuration, an associated geographical area of operation for the edge data network configuration. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
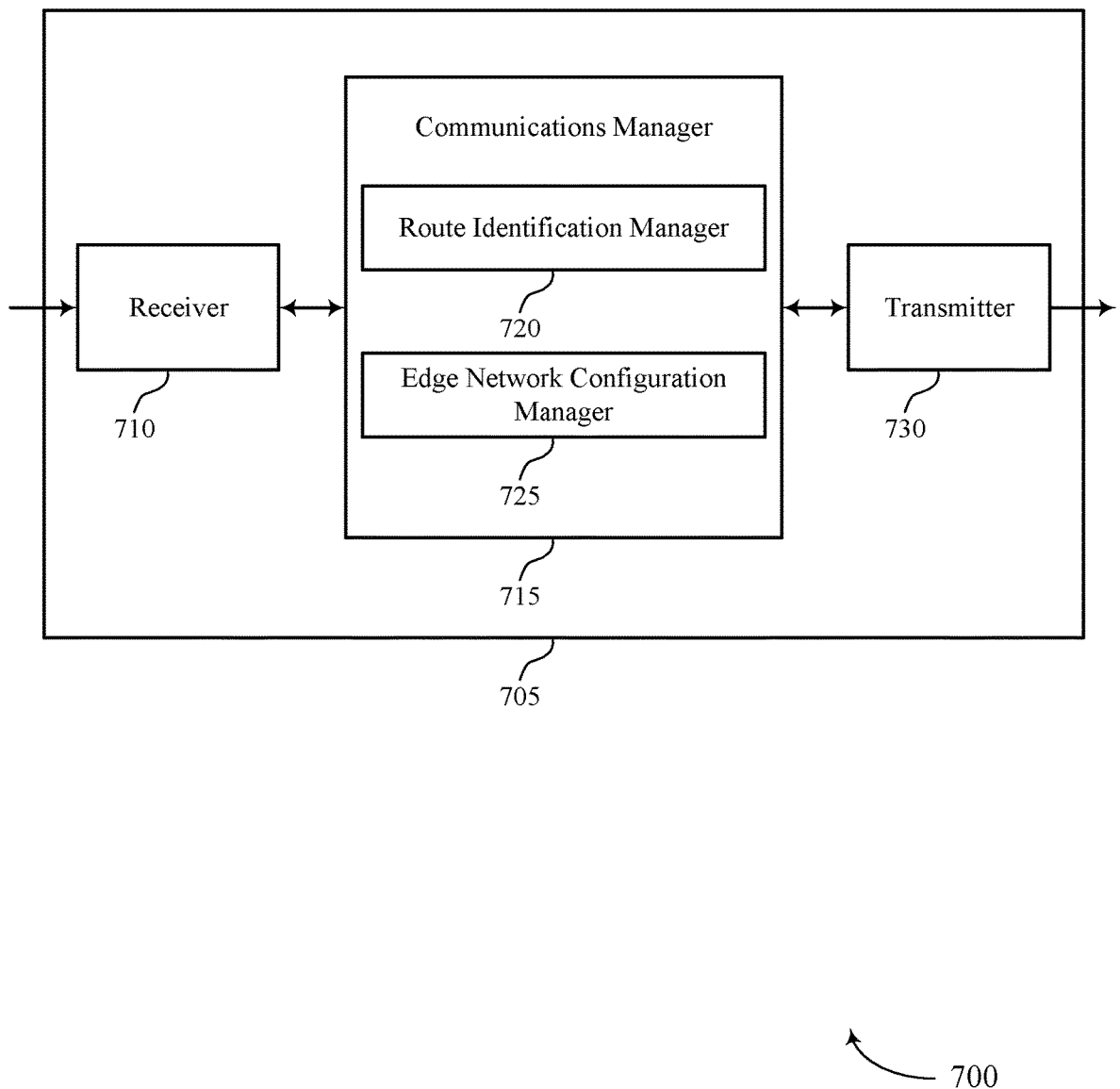

FIG. 7 shows a block diagram 700 of a device 705 that supports edge discovery techniques in wireless communications systems in accordance with aspects of the present disclosure. The device 705 may be an example of aspects of a device 605, or a UE 115 as described herein. The device 705 may include a receiver 710, a communications manager 715, and a transmitter 730. The device 705 may also include a processor. Each of these components may be in communication with one another (e.g., via one or more buses).

The receiver 710 may receive information such as packets, user data, or control information associated with various information channels (e.g., control channels, data channels, and information related to edge discovery techniques in wireless communications systems, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a route identification manager 720 and an edge network configuration manager 725. The communications manager 715 may be an example of aspects of the communications manager 910 described herein.

The route identification manager 720 may transmit, via a wireless communications network to an edge server of an edge data network, a request for edge information (e.g., a request for edge data network information or a request for edge application server information), the request including at least a first indication of a first geographical area in which the UE is currently located and a second indication of a second geographical area in which the UE is expected to be located in the future.

The edge network configuration manager 725 may receive, from the edge server, a response that provides a set of edge data network configurations and, for each edge data network configuration, an associated geographical area of operation for the edge data network configuration.

The transmitter 730 may transmit signals generated by other components of the device 705. In some examples, the transmitter 730 may be collocated with a receiver 710 in a transceiver module. For example, the transmitter 730 may be an example of aspects of the transceiver 920 described with reference to FIG. 9. The transmitter 730 may utilize a single antenna or a set of antennas.

Figure 8:
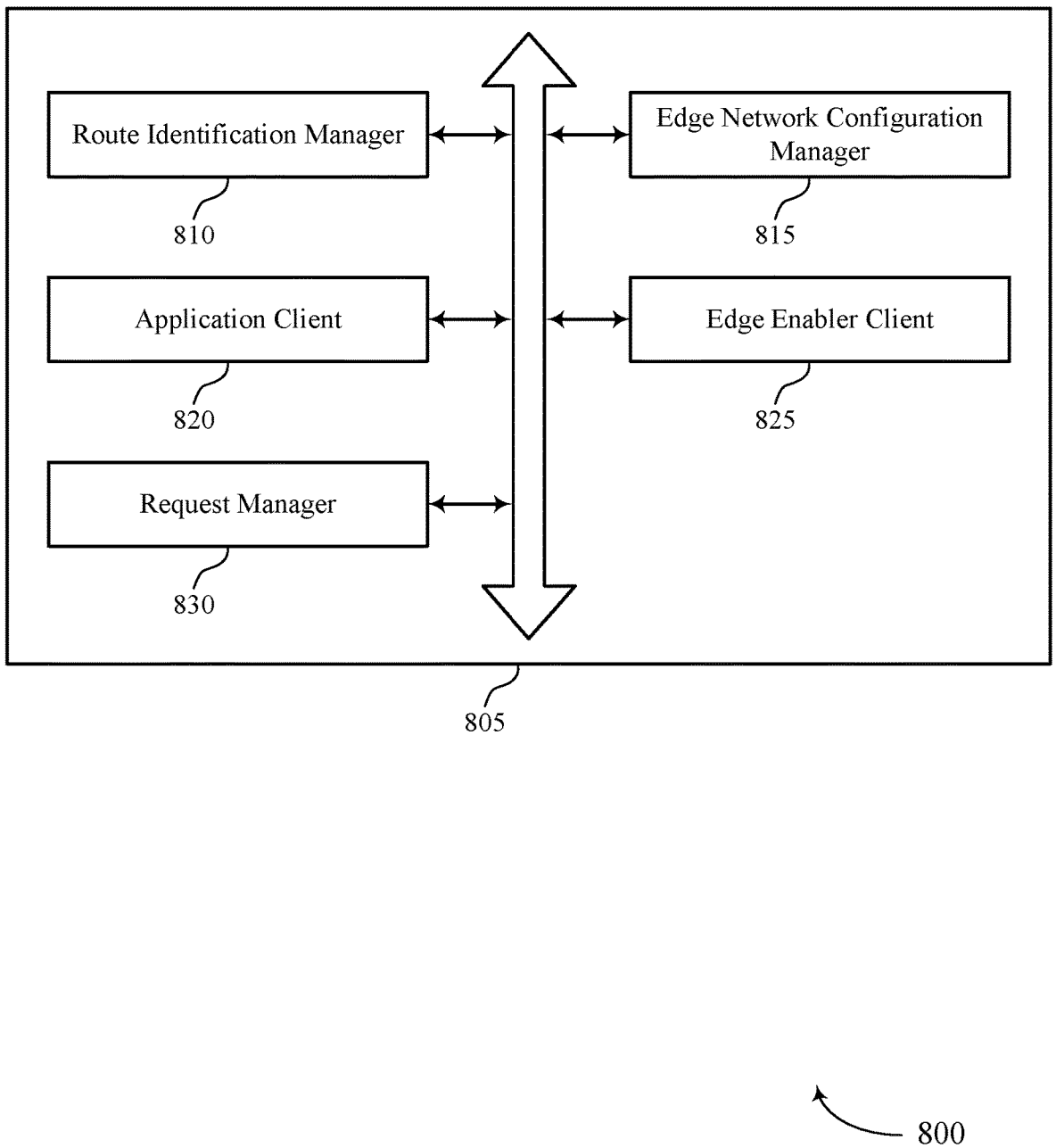
FIG. 8 shows a block diagram of a communications manager that supports edge discovery techniques in wireless communications systems in accordance with aspects of the present disclosure.

FIG. 8 shows a block diagram 800 of a communications manager 805 that supports edge discovery techniques in wireless communications systems in accordance with aspects of the present disclosure. The communications manager 805 may be an example of aspects of a communications manager 615, a communications manager 715, or a communications manager 910 described herein. The communications manager 805 may include a route identification manager 810, an edge network configuration manager 815, an application client 820, an edge enabler client 825, and a request manager 830. Each of these modules may communicate, directly or indirectly, with one another (e.g., via one or more buses).

The route identification manager 810 may transmit, via a wireless communications network to an edge server of an edge data network, a request for edge information (e.g., a request for edge data network information or a request for edge application server information), the request including at least a first indication of a first geographical area in which the UE is currently located and a second indication of a second geographical area in which the UE is expected to be located in the future.

In some cases, the first indication of the first geographical area and the second indication of the second geographical area are both included in a same request message. In some cases, the request for edge information includes a first request message and a second request message, and where the first request message includes the first indication of the first geographical area and the second request message includes the second indication of the second geographical area. In some cases, the expected future location of the UE is based on one or more of a geographic point, a polygon associated with the UE location, a configured route of the UE, a signaling map of the UE, a waypoint set of the UE, or any combinations thereof.

The edge network configuration manager 815 may receive, from the edge server, a response that provides a set of edge data network configurations and, for each edge data network configuration, an associated geographical area of operation for the edge data network configuration.

In some cases, the set of edge data network configurations includes connection information for a set of edge data network configuration servers including one or more of a first edge data network configuration server associated with the first geographic area, or a second edge data network configuration servers associated with the second geographic area. In some cases, the set of edge data network configurations includes information for a set of edge application server instances including one or more of a first edge application server instance associated with the first geographic area, or a second edge application server instance associated with the second geographic area. In some cases, the edge server is part of a base station of the wireless communications network.

The application client 820 may communicate with the first edge data network configuration server in the first geographical area. In some examples, the application client 820 may communicate with the first edge application server instance in the first geographical area.

The edge enabler client 825 may determine that the UE has moved to the second geographical area. In some examples, the edge enabler client 825 may communicate, responsive to the determining, with the second edge data network configuration server. In some examples, the edge enabler client 825 may communicate, responsive to the determining, with the second edge application server instance.

In some cases, the request is generated at an edge enabler client at the UE and transmitted to an edge data network configuration server via an EDGE-4 interface provided by the wireless communications network. In some cases, the response is received at the edge enabler client from the edge data network configuration server via the EDGE-4 interface. In some cases, the request is generated at an edge enabler client at the UE and transmitted to an edge enabler server via an EDGE-1 interface provided by the wireless communications network. In some cases, the response is received at the edge enabler client from the edge enabler server via the EDGE-1 interface.

The request manager 830 may manage edge data network request messages and formatting messages in one or more information elements for transmission via a wireless communications network. In some cases, the request for the edge data network information includes a set of information elements, including at least a first information element for a geographical area of operation that indicates one or more geographical areas.

Figure 9:
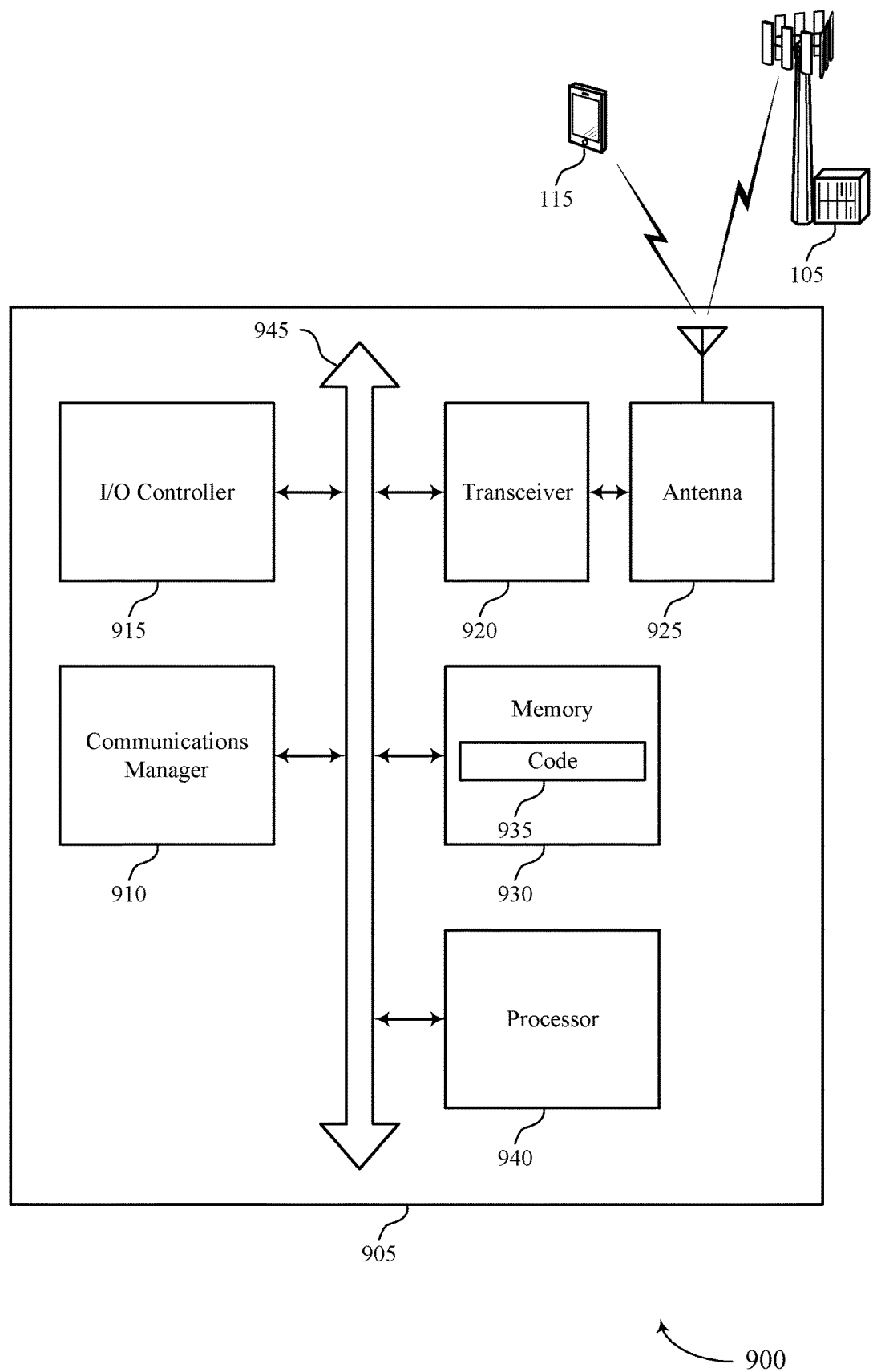
FIG. 9 shows a diagram of a system including a device that supports edge discovery techniques in wireless communications systems in accordance with aspects of the present disclosure.

FIG. 9 shows a diagram of a system 900 including a device 905 that supports edge discovery techniques in wireless communications systems in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may transmit, via a wireless communications network to an edge server of an edge data network, a request for edge information (e.g., a request for edge data network information or a request for edge application server information), the request including at least a first indication of a first geographical area in which the UE is currently located and a second indication of a second geographical area in which the UE is expected to be located in the future and receive, from the edge server, a response that provides a set of edge data network configurations and, for each edge data network configuration, an associated geographical area of operation for the edge data network configuration.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting edge discovery techniques in wireless communications systems).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
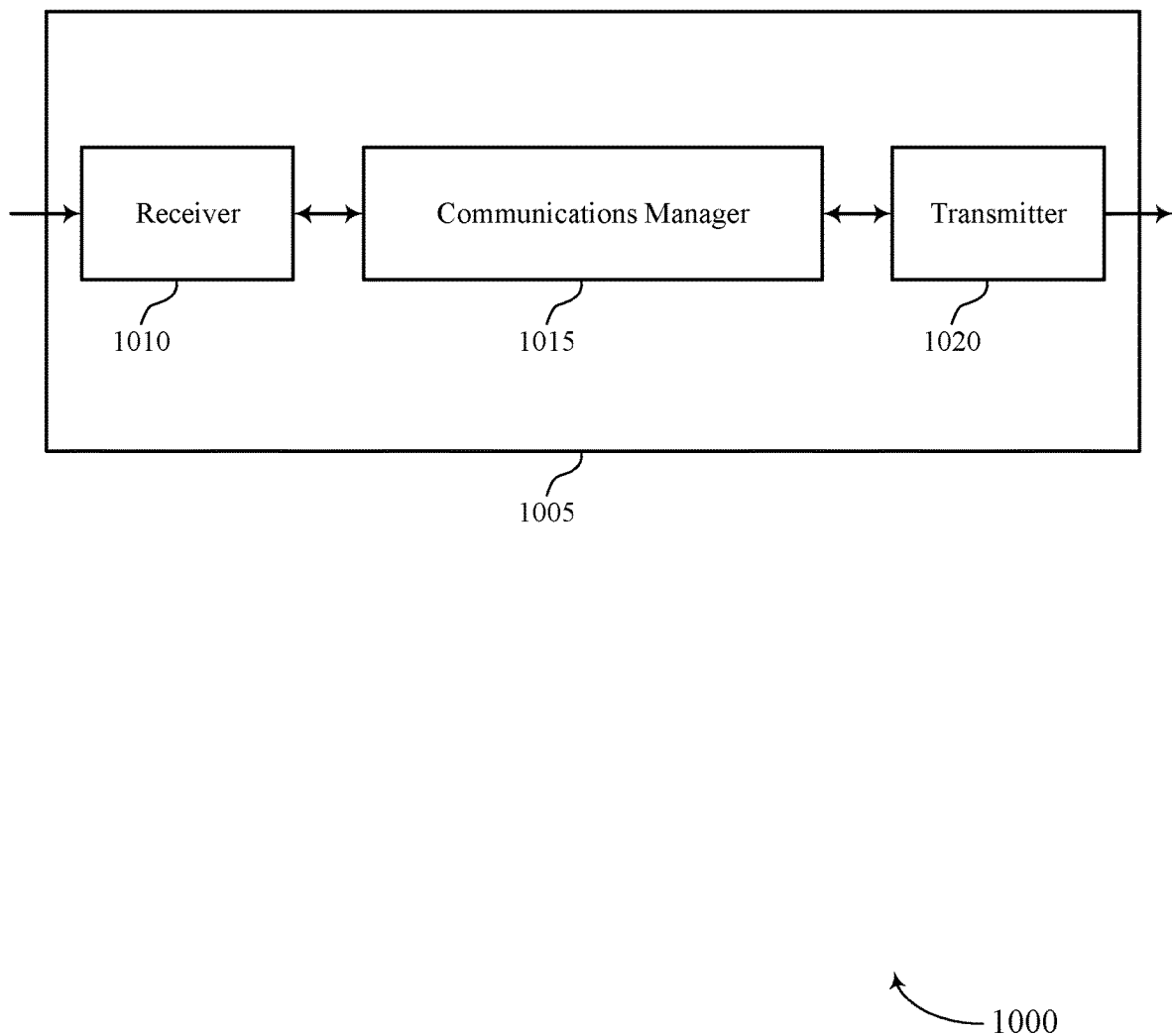
FIGS. 10 and 11 show block diagrams of devices that support edge discovery techniques in wireless communications systems in accordance with aspects of the present disclosure.

FIG. 10 shows a block diagram 1000 of a device 1005 that supports edge discovery techniques in wireless communications systems in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to edge discovery techniques in wireless communications systems, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may receive, from a UE via a wireless communications network, a request for edge information (e.g., a request for edge data network information or a request for edge application server information), the request including at least a first indication of a first geographical area in which the UE is currently located and a second indication of a second geographical area in which the UE is expected to be located in the future and transmit, to the UE, a response that provides a set of edge data network configurations and, for each edge data network configuration, an associated geographical area of operation for the edge data network configuration. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
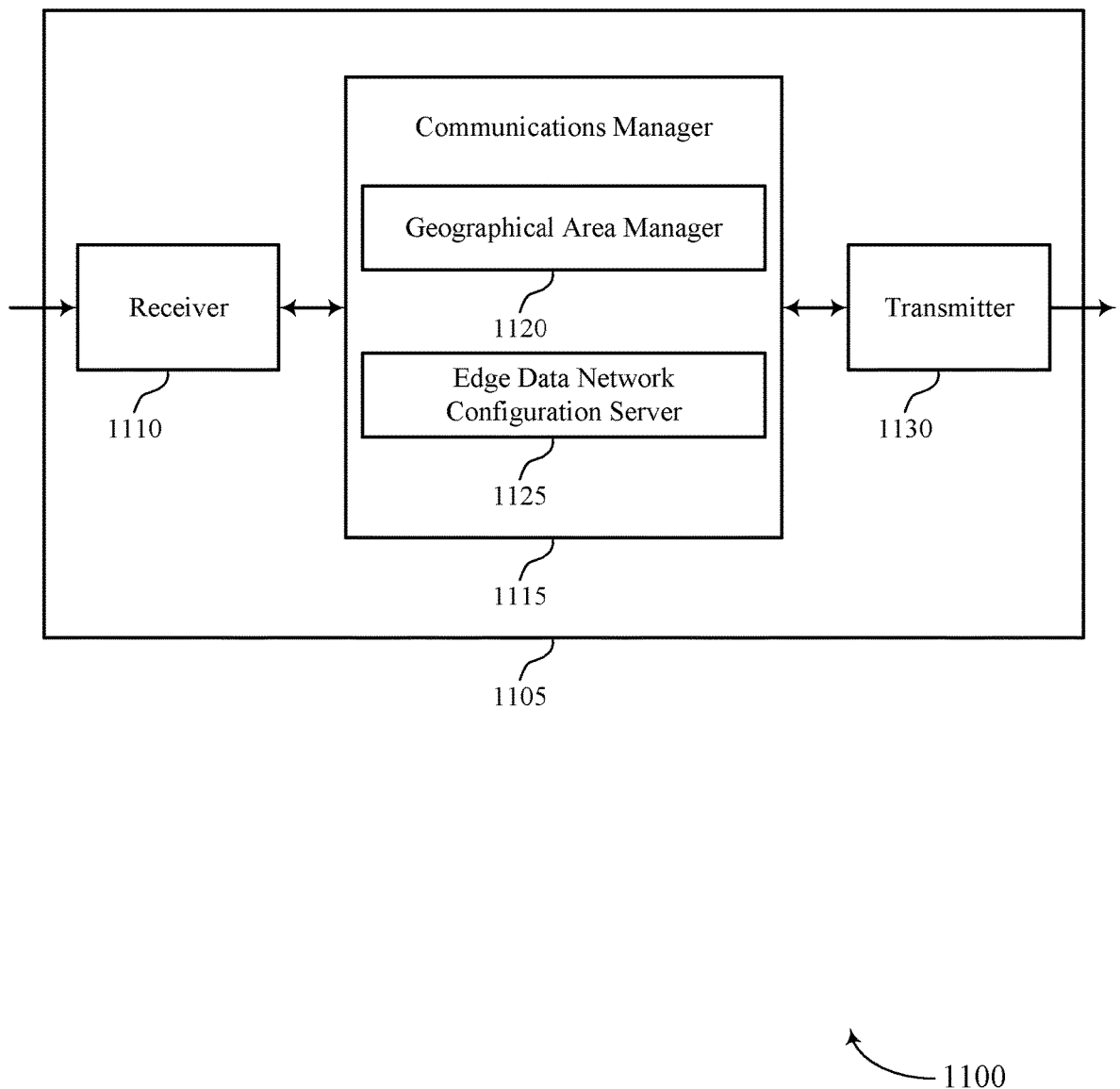

FIG. 11 shows a block diagram 1100 of a device 1105 that supports edge discovery techniques in wireless communications systems in accordance with aspects of the present disclosure. The device 1105 may be an example of aspects of a device 1005, or a base station 105 as described herein. The device 1105 may include a receiver 1110, a communications manager 1115, and a transmitter 1130. The device 1105 may also include a processor. Each of these components may be in communication with one another (e.g., via one or more buses).

The receiver 1110 may receive information such as packets, user data, or control information associated with various information channels (e.g., control channels, data channels, and information related to edge discovery techniques in wireless communications systems, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a geographical area manager 1120 and an edge data network configuration server 1125. The communications manager 1115 may be an example of aspects of the communications manager 1310 described herein.

The geographical area manager 1120 may receive, from a UE via a wireless communications network, a request for edge information (e.g., a request for edge data network information or a request for edge application server information), the request including at least a first indication of a first geographical area in which the UE is currently located and a second indication of a second geographical area in which the UE is expected to be located in the future.

The edge data network configuration server 1125 may transmit, to the UE, a response that provides a set of edge data network configurations and, for each edge data network configuration, an associated geographical area of operation for the edge data network configuration.

The transmitter 1130 may transmit signals generated by other components of the device 1105. In some examples, the transmitter 1130 may be collocated with a receiver 1110 in a transceiver module. For example, the transmitter 1130 may be an example of aspects of the transceiver 1320 described with reference to FIG. 13. The transmitter 1130 may utilize a single antenna or a set of antennas.

Figure 12:
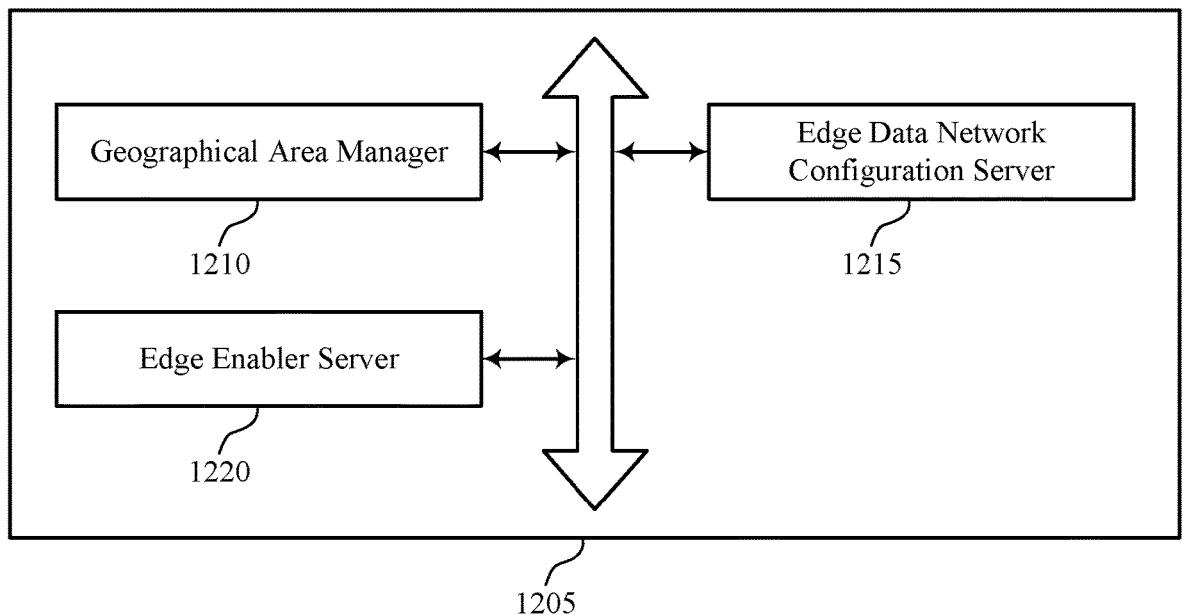
FIG. 12 shows a block diagram of a communications manager that supports edge discovery techniques in wireless communications systems in accordance with aspects of the present disclosure.

FIG. 12 shows a block diagram 1200 of a communications manager 1205 that supports edge discovery techniques in wireless communications systems in accordance with aspects of the present disclosure. The communications manager 1205 may be an example of aspects of a communications manager 1015, a communications manager 1115, or a communications manager 1310 described herein. The communications manager 1205 may include a geographical area manager 1210, an edge data network configuration server 1215, and an edge enabler server 1220. Each of these modules may communicate, directly or indirectly, with one another (e.g., via one or more buses).

The geographical area manager 1210 may receive, from a UE via a wireless communications network, a request for edge information (e.g., a request for edge data network information or a request for edge application server information), the request including at least a first indication of a first geographical area in which the UE is currently located and a second indication of a second geographical area in which the UE is expected to be located in the future. In some cases, the first indication of the first geographical area and the second indication of the second geographical area are both included in a same request message. In some cases, the request for edge information includes a first request message and a second request message, and where the first request message includes the first indication of the first geographical area and the second request message includes the second indication of the second geographical area. In some cases, the expected future location of the UE is based on one or more of a geographic point, a polygon associated with the UE location, a configured route of the UE, a signaling map of the UE, a waypoint set of the UE, or any combinations thereof. In some cases, the geographical area of operation of each of the edge data network configuration is provided as one or more of a geographic point, a polygon, a portion of a configured route of the UE, a portion of a signaling map of the UE, a waypoint of a waypoint set of the UE, or any combinations thereof.

The edge data network configuration server 1215 may transmit, to the UE, a response that provides a set of edge data network configurations and, for each edge data network configuration, an associated geographical area of operation for the edge data network configuration. In some examples, the edge data network configuration server 1215 may configure the first edge data network configuration server and the second edge data network configuration server with context information of the UE.

In some cases, the set of edge data network configurations includes connection information for a set of edge data network configuration servers including one or more of a first edge data network configuration server associated with the first geographic area, or a second edge data network configuration servers associated with the second geographic area.

In some cases, the request for edge information includes a set of information elements, including at least a first information element for a geographical area of operation that indicates the one or more geographical areas. In some cases, the request is generated at an edge enabler client at the UE and received at an edge data network configuration server via an EDGE-4 interface provided by the wireless communications network. In some cases, the response is transmitted to the edge enabler client from the edge data network configuration server via the EDGE-4 interface.

The edge enabler server 1220 may configure one or more of a first edge application server to provide the first edge application server instance for the UE, or a second edge application server to provide the second edge application server instance for the UE. In some cases, the set of edge data network configurations includes information for a set of edge application server instances including one or more of a first edge application server instance associated with the first geographic area, or a second edge application server instance associated with the second geographic area. In some cases, the network node is part of a base station of the wireless communications network.

In some cases, the request is generated at an edge enabler client at the UE and received at an edge enabler server via an EDGE-1 interface provided by the wireless communications network. In some cases, the response is transmitted to the edge enabler client from the edge enabler server via the EDGE-1 interface.

Figure 13:
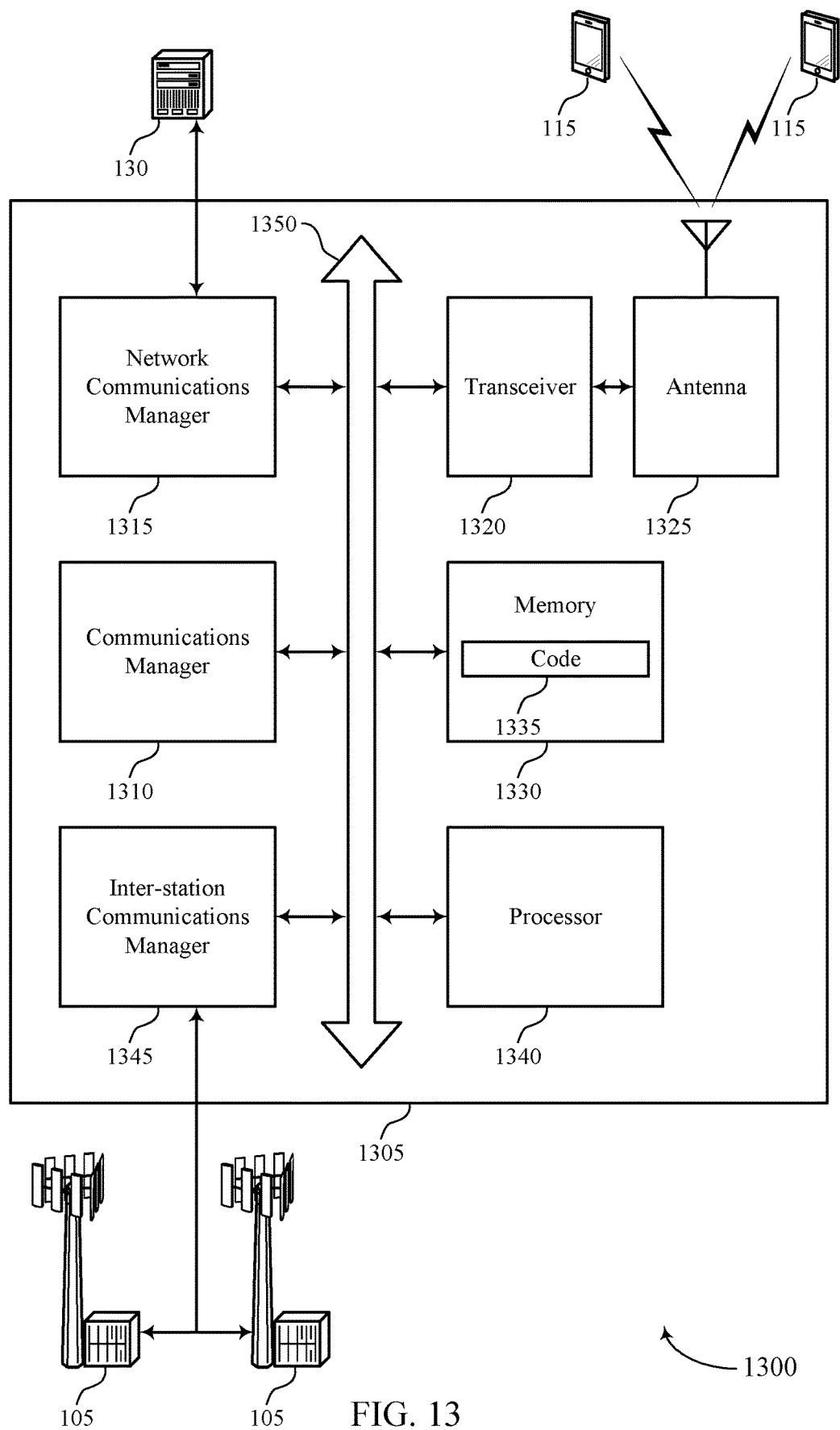
FIG. 13 shows a diagram of a system including a device that supports edge discovery techniques in wireless communications systems in accordance with aspects of the present disclosure.

FIG. 13 shows a diagram of a system 1300 including a device 1305 that supports edge discovery techniques in wireless communications systems in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may receive, from a UE via a wireless communications network, a request for edge information (e.g., a request for edge data network information or a request for edge application server information), the request including at least a first indication of a first geographical area in which the UE is currently located and a second indication of a second geographical area in which the UE is expected to be located in the future and transmit, to the UE, a response that provides a set of edge data network configurations and, for each edge data network configuration, an associated geographical area of operation for the edge data network configuration.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting edge discovery techniques in wireless communications systems).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
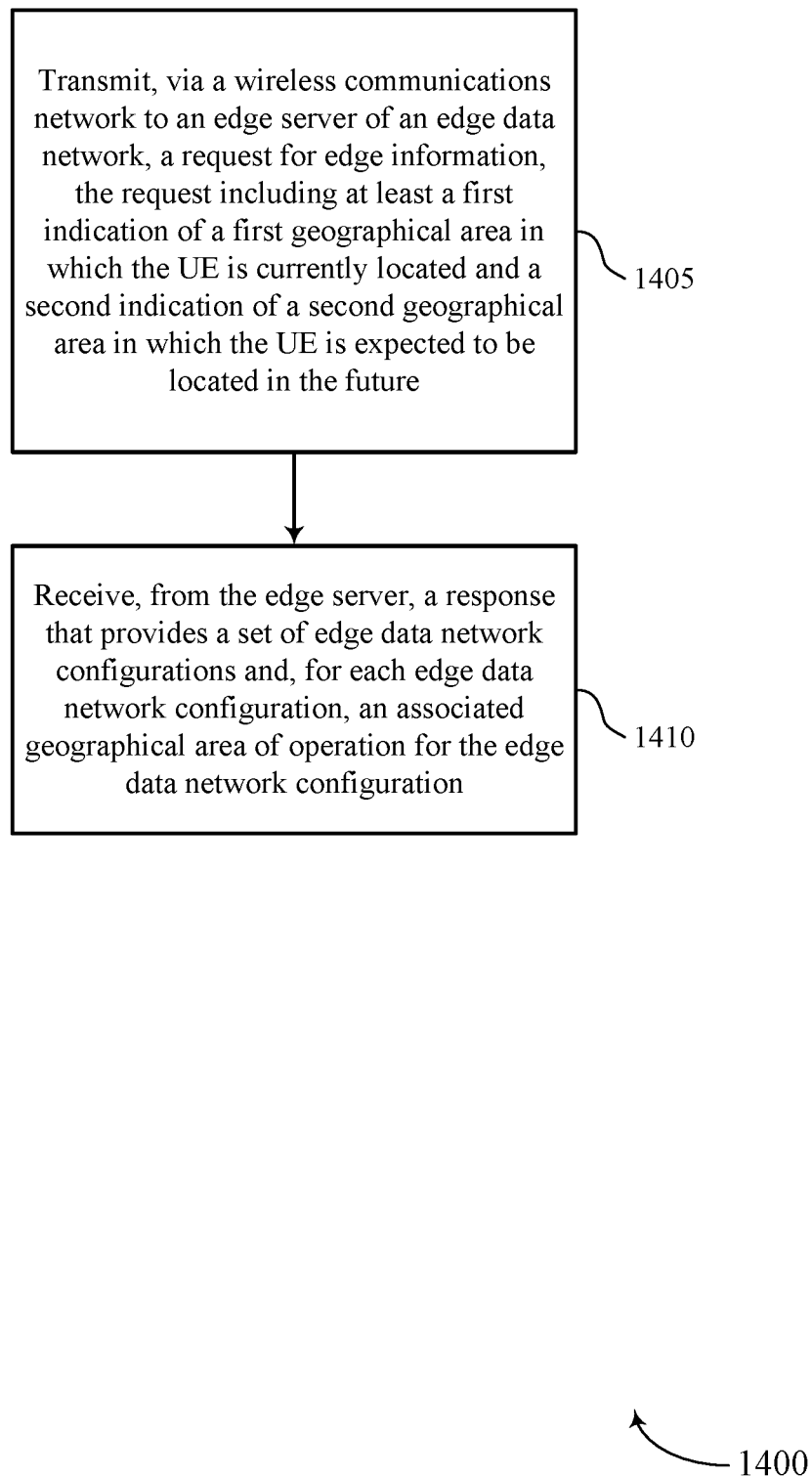
FIGS. 14 through 19 show flowcharts illustrating methods that support edge discovery techniques in wireless communications systems in accordance with aspects of the present disclosure.

FIG. 14 shows a flowchart illustrating a method 1400 that supports edge discovery techniques in wireless communications systems in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may transmit, via a wireless communications network to an edge server of an edge data network, a request for edge information (e.g., a request for edge data network information or a request for edge application server information), the request including at least a first indication of a first geographical area in which the UE is currently located and a second indication of a second geographical area in which the UE is expected to be located in the future. The operations of 1405 may be performed according to the methods described herein. In some examples, aspects of the operations of 1405 may be performed by a route identification manager as described with reference to FIGS. 6 through 9.

At 1410, the UE may receive, from the edge server, a response that provides a set of edge data network configurations and, for each edge data network configuration, an associated geographical area of operation for the edge data network configuration. The operations of 1410 may be performed according to the methods described herein. In some examples, aspects of the operations of 1410 may be performed by an edge network configuration manager as described with reference to FIGS. 6 through 9.

Figure 15:
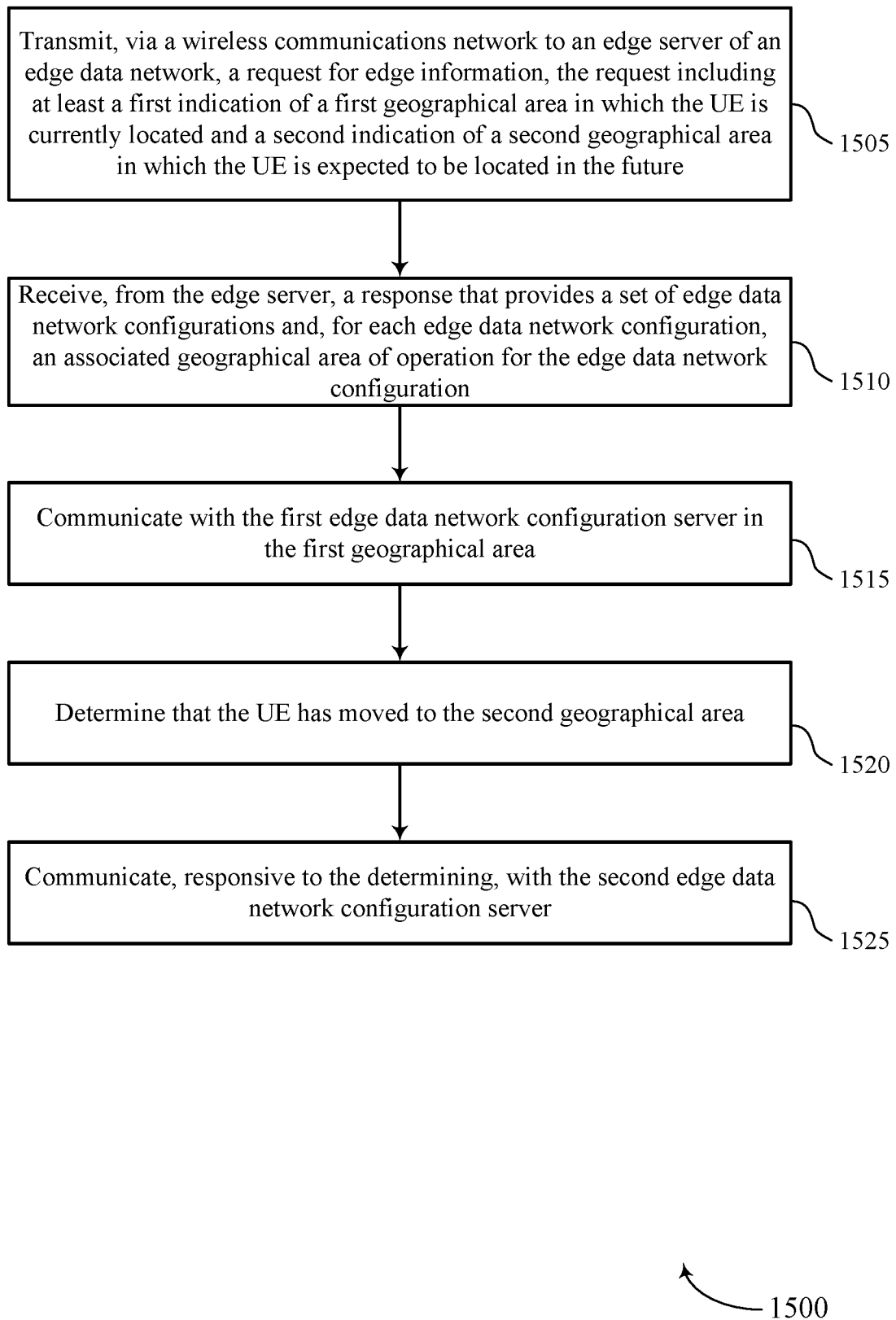

FIG. 15 shows a flowchart illustrating a method 1500 that supports edge discovery techniques in wireless communications systems in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may transmit, via a wireless communications network to an edge server of an edge data network, a request for edge information (e.g., a request for edge data network information or a request for edge application server information), the request including at least a first indication of a first geographical area in which the UE is currently located and a second indication of a second geographical area in which the UE is expected to be located in the future. The operations of 1505 may be performed according to the methods described herein. In some examples, aspects of the operations of 1505 may be performed by a route identification manager as described with reference to FIGS. 6 through 9.

At 1510, the UE may receive, from the edge server, a response that provides a set of edge data network configurations and, for each edge data network configuration, an associated geographical area of operation for the edge data network configuration. The operations of 1510 may be performed according to the methods described herein. In some examples, aspects of the operations of 1510 may be performed by an edge network configuration manager as described with reference to FIGS. 6 through 9. In some cases, the set of edge data network configurations includes connection information for a set of edge data network configuration servers including one or more of a first edge data network configuration server associated with the first geographic area, or a second edge data network configuration servers associated with the second geographic area.

At 1515, the UE may communicate with the first edge data network configuration server in the first geographical area. The operations of 1515 may be performed according to the methods described herein. In some examples, aspects of the operations of 1515 may be performed by an application client as described with reference to FIGS. 6 through 9.

At 1520, the UE may determine that the UE has moved to the second geographical area. The operations of 1520 may be performed according to the methods described herein. In some examples, aspects of the operations of 1520 may be performed by an edge enabler client as described with reference to FIGS. 6 through 9.

At 1525, the UE may communicate, responsive to the determining, with the second edge data network configuration server. The operations of 1525 may be performed according to the methods described herein. In some examples, aspects of the operations of 1525 may be performed by an edge enabler client as described with reference to FIGS. 6 through 9.

Figure 16:
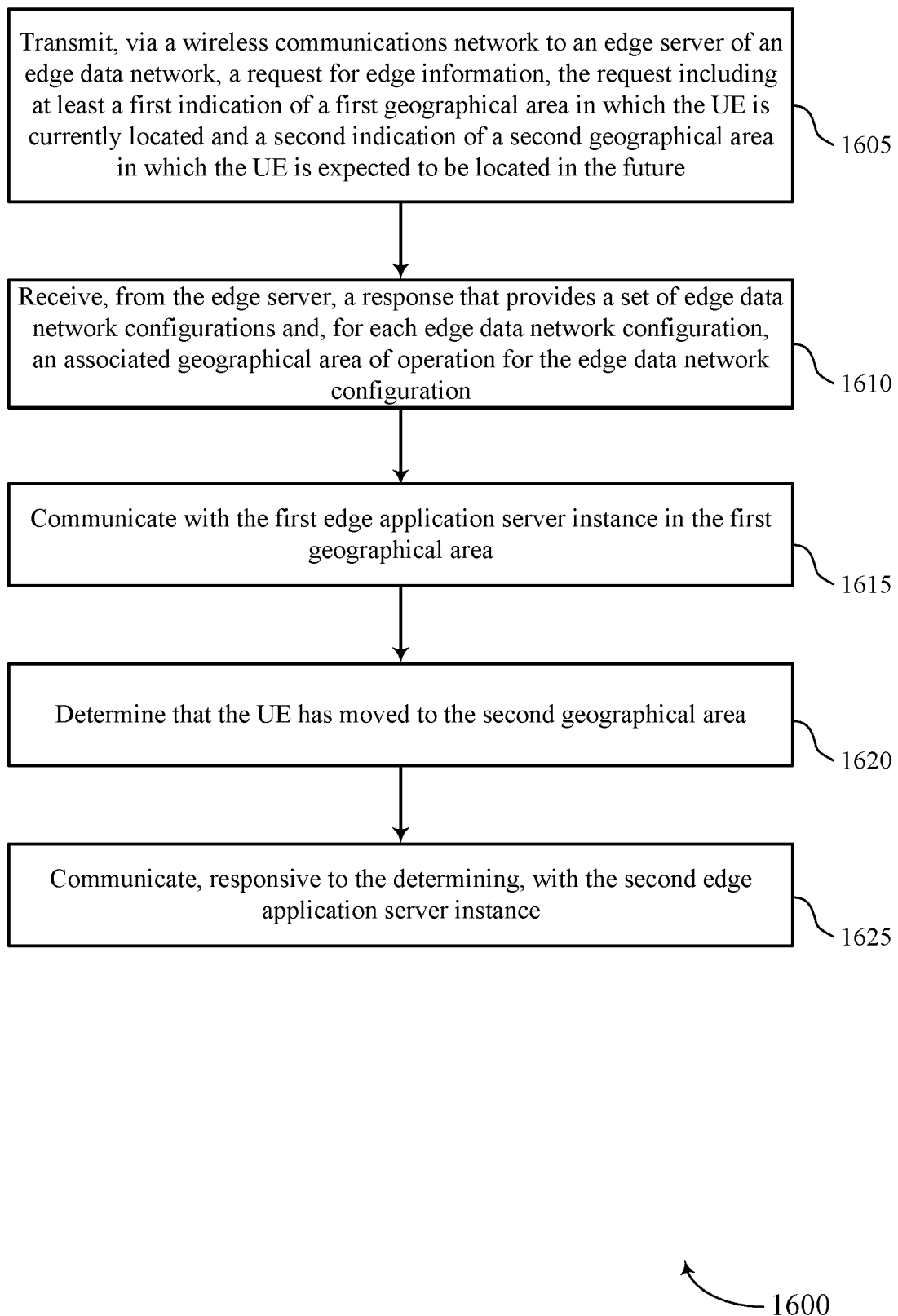

FIG. 16 shows a flowchart illustrating a method 1600 that supports edge discovery techniques in wireless communications systems in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may transmit, via a wireless communications network to an edge server of an edge data network, a request for edge information (e.g., a request for edge data network information or a request for edge application server information), the request including at least a first indication of a first geographical area in which the UE is currently located and a second indication of a second geographical area in which the UE is expected to be located in the future. The operations of 1605 may be performed according to the methods described herein. In some examples, aspects of the operations of 1605 may be performed by a route identification manager as described with reference to FIGS. 6 through 9.

At 1610, the UE may receive, from the edge server, a response that provides a set of edge data network configurations and, for each edge data network configuration, an associated geographical area of operation for the edge data network configuration. The operations of 1610 may be performed according to the methods described herein. In some examples, aspects of the operations of 1610 may be performed by an edge network configuration manager as described with reference to FIGS. 6 through 9. In some cases, the set of edge data network configurations includes information for a set of edge application server instances including one or more of a first edge application server instance associated with the first geographic area, or a second edge application server instance associated with the second geographic area.

At 1615, the UE may communicate with the first edge application server instance in the first geographical area. The operations of 1615 may be performed according to the methods described herein. In some examples, aspects of the operations of 1615 may be performed by an application client as described with reference to FIGS. 6 through 9.

At 1620, the UE may determine that the UE has moved to the second geographical area. The operations of 1620 may be performed according to the methods described herein. In some examples, aspects of the operations of 1620 may be performed by an edge enabler client as described with reference to FIGS. 6 through 9.

At 1625, the UE may communicate, responsive to the determining, with the second edge application server instance. The operations of 1625 may be performed according to the methods described herein. In some examples, aspects of the operations of 1625 may be performed by an edge enabler client as described with reference to FIGS. 6 through 9.

Figure 17:
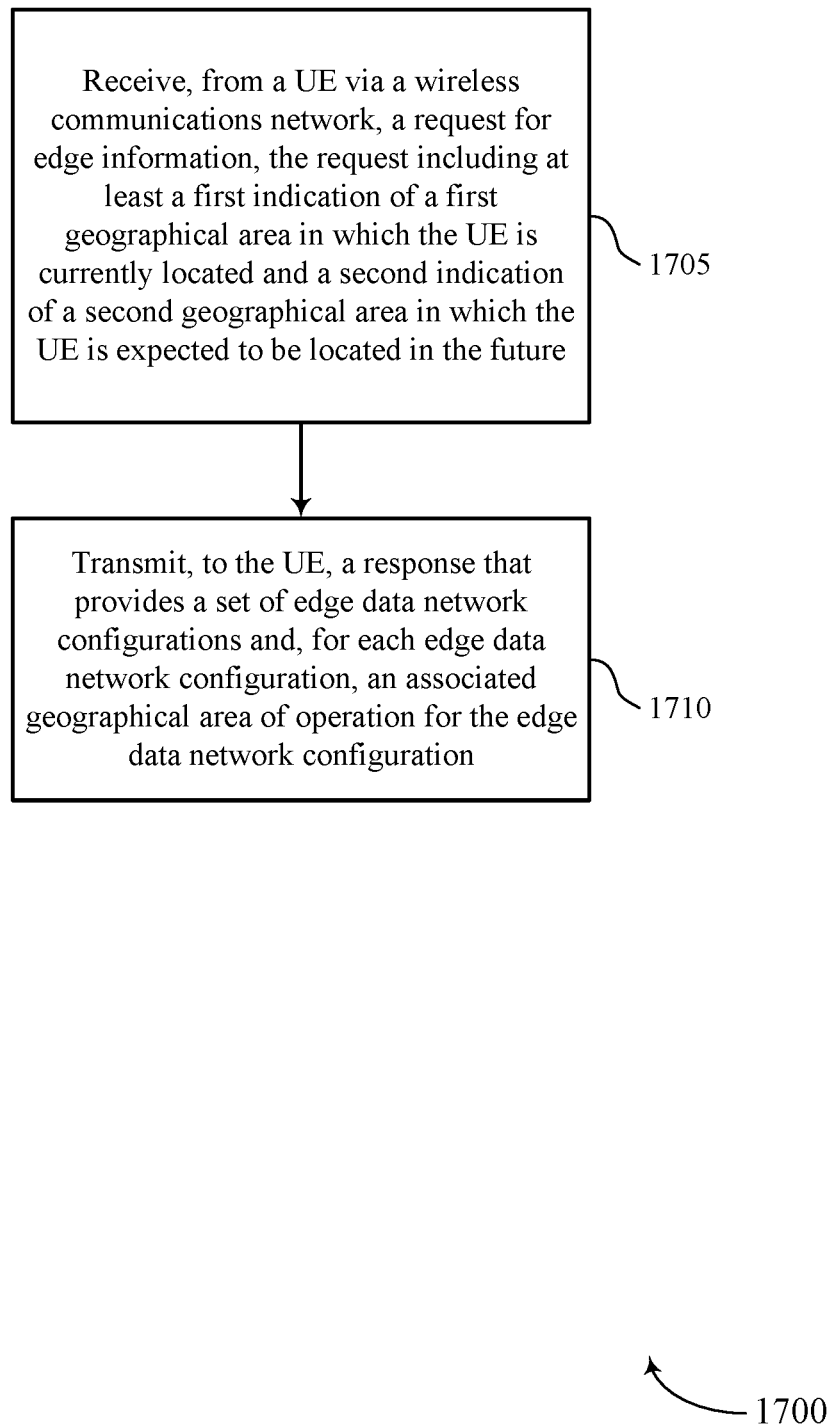

FIG. 17 shows a flowchart illustrating a method 1700 that supports edge discovery techniques in wireless communications systems in accordance with aspects of the present disclosure. The operations of method 1700 may be implemented by a base station 105 or its components as described herein. For example, the operations of method 1700 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1705, the base station may receive, from a UE via a wireless communications network, a request for edge information (e.g., a request for edge data network information or a request for edge application server information), the request including at least a first indication of a first geographical area in which the UE is currently located and a second indication of a second geographical area in which the UE is expected to be located in the future. The operations of 1705 may be performed according to the methods described herein. In some examples, aspects of the operations of 1705 may be performed by a geographical area manager as described with reference to FIGS. 10 through 13.

At 1710, the base station may transmit, to the UE, a response that provides a set of edge data network configurations and, for each edge data network configuration, an associated geographical area of operation for the edge data network configuration. The operations of 1710 may be performed according to the methods described herein. In some examples, aspects of the operations of 1710 may be performed by an edge data network configuration server as described with reference to FIGS. 10 through 13.

Figure 18:
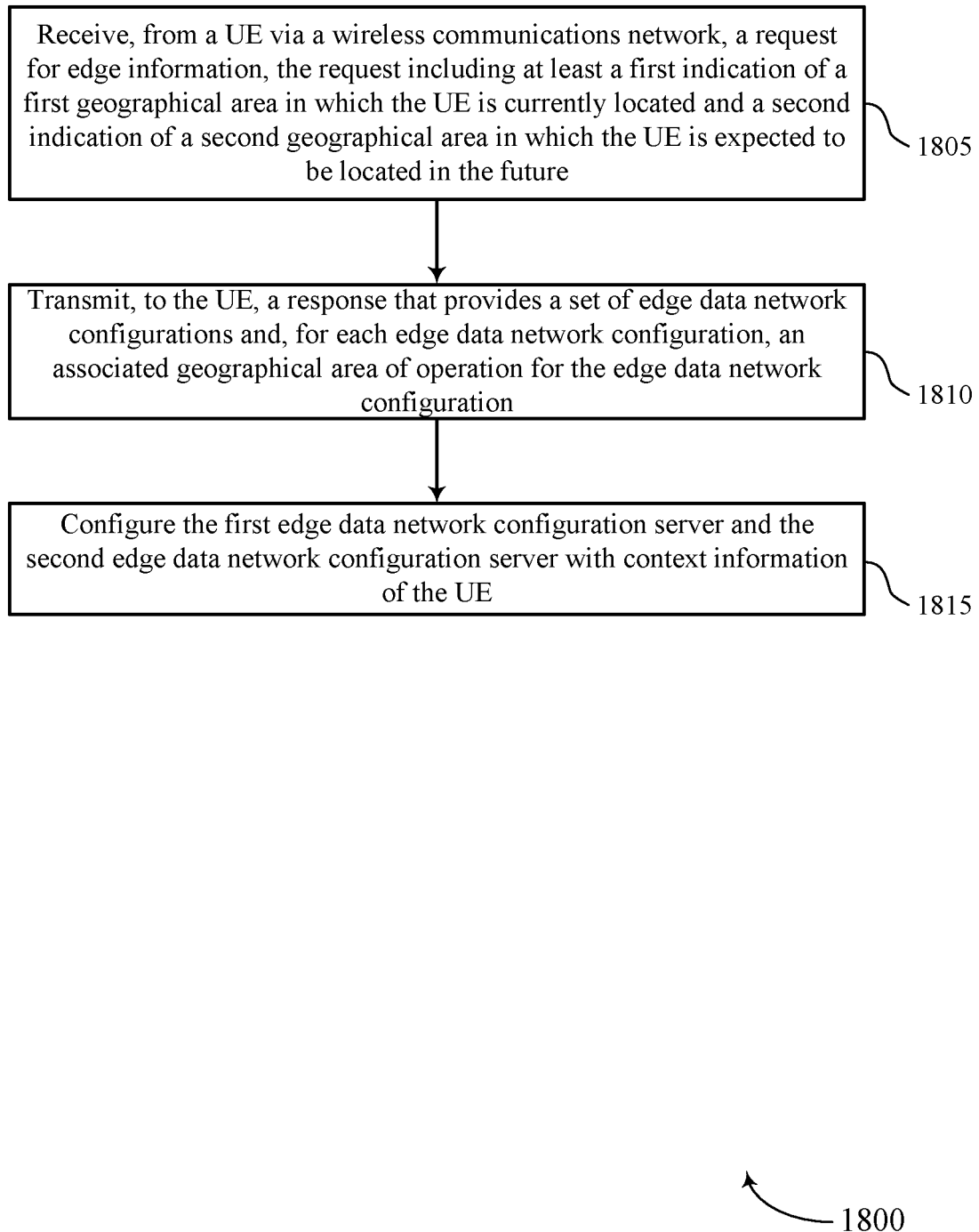

FIG. 18 shows a flowchart illustrating a method 1800 that supports edge discovery techniques in wireless communications systems in accordance with aspects of the present disclosure. The operations of method 1800 may be implemented by a base station 105 or its components as described herein. For example, the operations of method 1800 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1805, the base station may receive, from a UE via a wireless communications network, a request for edge information (e.g., a request for edge data network information or a request for edge application server information), the request including at least a first indication of a first geographical area in which the UE is currently located and a second indication of a second geographical area in which the UE is expected to be located in the future. The operations of 1805 may be performed according to the methods described herein. In some examples, aspects of the operations of 1805 may be performed by a geographical area manager as described with reference to FIGS. 10 through 13.

At 1810, the base station may transmit, to the UE, a response that provides a set of edge data network configurations and, for each edge data network configuration, an associated geographical area of operation for the edge data network configuration. The operations of 1810 may be performed according to the methods described herein. In some examples, aspects of the operations of 1810 may be performed by an edge data network configuration server as described with reference to FIGS. 10 through 13. In some cases, the set of edge data network configurations includes connection information for a set of edge data network configuration servers including one or more of a first edge data network configuration server associated with the first geographic area, or a second edge data network configuration servers associated with the second geographic area.

At 1815, the base station may configure the first edge data network configuration server and the second edge data network configuration server with context information of the UE. The operations of 1815 may be performed according to the methods described herein. In some examples, aspects of the operations of 1815 may be performed by an edge data network configuration server as described with reference to FIGS. 10 through 13.

Figure 19:
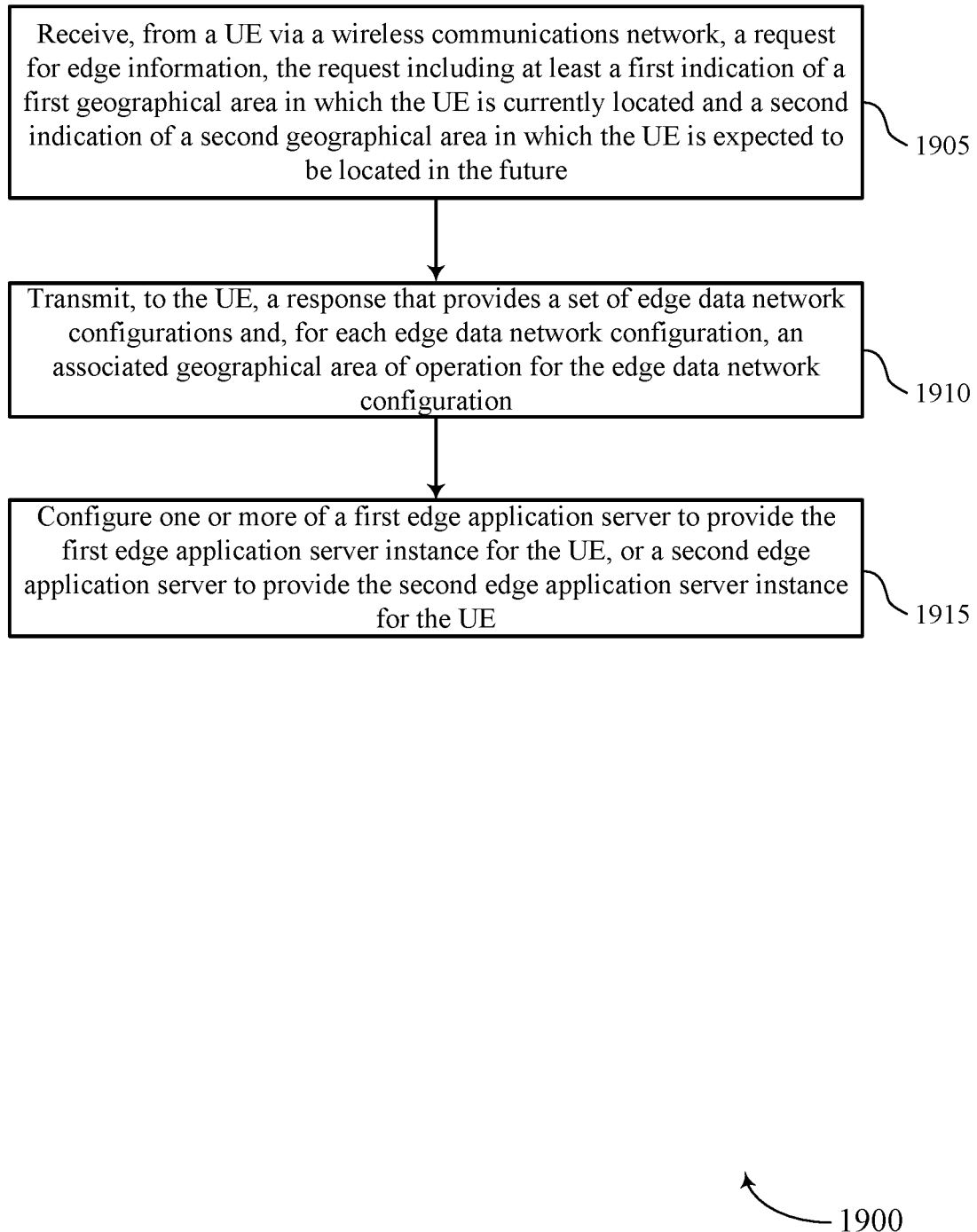

FIG. 19 shows a flowchart illustrating a method 1900 that supports edge discovery techniques in wireless communications systems in accordance with aspects of the present disclosure. The operations of method 1900 may be implemented by a base station 105 or its components as described herein. For example, the operations of method 1900 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1905, the base station may receive, from a UE via a wireless communications network, a request for edge information (e.g., a request for edge data network information or a request for edge application server information), the request including at least a first indication of a first geographical area in which the UE is currently located and a second indication of a second geographical area in which the UE is expected to be located in the future. The operations of 1905 may be performed according to the methods described herein. In some examples, aspects of the operations of 1905 may be performed by a geographical area manager as described with reference to FIGS. 10 through 13.

At 1910, the base station may transmit, to the UE, a response that provides a set of edge data network configurations and, for each edge data network configuration, an associated geographical area of operation for the edge data network configuration. The operations of 1910 may be performed according to the methods described herein. In some examples, aspects of the operations of 1910 may be performed by an edge data network configuration server as described with reference to FIGS. 10 through 13. In some cases, the set of edge data network configurations includes information for a set of edge application server instances including one or more of a first edge application server instance associated with the first geographic area, or a second edge application server instance associated with the second geographic area.

At 1915, the base station may configure one or more of a first edge application server to provide the first edge application server instance for the UE, or a second edge application server to provide the second edge application server instance for the UE. The operations of 1915 may be performed according to the methods described herein. In some examples, aspects of the operations of 1915 may be performed by an edge enabler server as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general-purpose or special-purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    transmitting, via a wireless communications network to an edge server of an edge data network, a request for edge information associated with adding a network service, the request including at least a first indication of a first geographical area in which the UE is currently located and a second indication of a second geographical area in which the UE is expected to be located in the future, wherein the second indication includes one or more indications different from the first indication; and
    for each of the first indication and second indication, receiving, from the edge server, one or more separate responses that each provides a set of edge data network configurations and, for each edge data network configuration, an associated geographical area of operation for the edge data network configuration for the corresponding first or second indication.

2. The method of claim 1, wherein the first indication of the first geographical area and the second indication of the second geographical area are both included in a same request message.

3. The method of claim 1, wherein the request for edge information includes a first request message and a second request message, and wherein the first request message includes the first indication of the first geographical area and the second request message includes the second indication of the second geographical area.

4. The method of claim 1, wherein the set of edge data network configurations includes connection information for a plurality of edge configuration servers including one or more of a first edge configuration server associated with the first geographic area, or a second edge configuration servers associated with the second geographic area.

5. The method of claim 4, further comprising:
    communicating with the first edge configuration server in the first geographical area;
    determining that the UE has moved to the second geographical area; and
    communicating, responsive to the determining, with the second edge configuration server.

6. The method of claim 1, wherein the set of edge data network configurations includes information for a plurality of edge application server instances including one or more of a first edge application server instance associated with the first geographic area, or a second edge application server instance associated with the second geographic area.

7. The method of claim 6, further comprising:
    communicating with the first edge application server instance in the first geographical area;
    determining that the UE has moved to the second geographical area; and
    communicating, responsive to the determining, with the second edge application server instance.

8. The method of claim 1, wherein the expected future location of the UE is based at least in part on one or more of a geographic point, a polygon associated with the UE location, a configured route of the UE, a signaling map of the UE, a waypoint set of the UE, or any combinations thereof.

9. The method of claim 1, wherein the request for the edge data network information comprises a plurality of information elements, including at least a first information element that comprises the first indication of the first geographical area in which the UE is currently located and the second indication of the second geographical area in which the UE is expected to be located in the future.

10. The method of claim 1, wherein the geographical area of operation of each of the edge data network configuration is provided as one or more of a geographic point, a polygon, a portion of a configured route of the UE, a portion of a signaling map of the UE, a waypoint of a waypoint set of the UE, or any combinations thereof.

11. The method of claim 1, wherein the edge server is part of a base station of the wireless communications network.

12. The method of claim 1, wherein:
the request is generated at an edge enabler client at the UE and transmitted to an edge configuration server via an EDGE-4 interface provided by the wireless communications network; and
the one or more separate responses are received at the edge enabler client from the edge configuration server via the EDGE-4 interface.

13. The method of claim 1, wherein:
the request is generated at an edge enabler client at the UE and transmitted to an edge enabler server via an EDGE-1 interface provided by the wireless communications network; and
the one or more separate responses are received at the edge enabler client from the edge enabler server via the EDGE-1 interface.

14. A method for wireless communication at a network node of an edge data network, comprising:
receiving, from a user equipment (UE) via a wireless communications network, a request for edge information associated with adding a network service, the request including at least a first indication of a first geographical area in which the UE is currently located and a second indication of a second geographical area in which the UE is expected to be located in the future, wherein the second indication includes one or more indications different from the first indication; and
for each of the first indication and second indication, transmitting, to the UE, one or more separate responses that each provides a set of edge data network configurations and, for each edge data network configuration, an associated geographical area of operation for the edge data network configuration for the corresponding first or second indication.

15. The method of claim 14, wherein the first indication of the first geographical area and the second indication of the second geographical area are both included in a same request message.

16. The method of claim 14, wherein the request for edge information includes a first request message and a second request message, and wherein the first request message includes the first indication of the first geographical area and the second request message includes the second indication of the second geographical area.

17. The method of claim 14, wherein the set of edge data network configurations includes connection information for a plurality of edge configuration servers including one or more of a first edge configuration server associated with the first geographic area, or a second edge configuration servers associated with the second geographic area.

18. The method of claim 17, further comprising:
configuring the first edge configuration server and the second edge configuration server with context information of the UE.

19. The method of claim 14, wherein the set of edge data network configurations includes information for a plurality of edge application server instances including one or more of a first edge application server instance associated with the first geographic area, or a second edge application server instance associated with the second geographic area.

20. The method of claim 19, further comprising:
configuring one or more of a first edge application server to provide the first edge application server instance for the UE, or a second edge application server to provide the second edge application server instance for the UE.

21. The method of claim 14, wherein the expected future location of the UE is based at least in part on one or more of a geographic point, a polygon associated with the UE location, a configured route of the UE, a signaling map of the UE, a waypoint set of the UE, or any combinations thereof.

22. The method of claim 14, wherein the request for edge information comprises a plurality of information elements, including at least a first information element that comprises the first indication of the first geographical area in which the UE is currently located and the second indication of the second geographical area in which the UE is expected to be located in the future.

23. The method of claim 14, wherein the geographical area of operation of each of the edge data network configuration is provided as one or more of a geographic point, a polygon, a portion of a configured route of the UE, a portion of a signaling map of the UE, a waypoint of a waypoint set of the UE, or any combinations thereof.

24. The method of claim 14, wherein the network node is part of a base station of the wireless communications network.

25. The method of claim 24, wherein:
the request is generated at an edge enabler client at the UE and received at an edge configuration server via an EDGE-4 interface provided by the wireless communications network; and
the one or more separate responses are transmitted to the edge enabler client from the edge configuration server via the EDGE-4 interface.

26. The method of claim 24, wherein:
the request is generated at an edge enabler client at the UE and received at an edge enabler server via an EDGE-1 interface provided by the wireless communications network; and
the one or more separate responses are transmitted to the edge enabler client from the edge enabler server via the EDGE-1 interface.

27. An apparatus for wireless communication at a user equipment (UE), comprising:
a processor, memory coupled with the processor; and
instructions stored in the memory and executable by the processor to cause the apparatus to:
transmit, via a wireless communications network to an edge server of an edge data network, a request for edge information associated with adding a network service, the request including at least a first indication of a first geographical area in which the UE is currently located and a second indication of a second geographical area in which the UE is expected to be located in the future, wherein the second indication includes one or more indications different from the first indication; and
for each of the first indication and second indication, receive, from the edge server, one or more separate responses that each provides a set of edge data network configurations and, for each edge data network configuration, an associated geographical area of operation for the edge data network configuration for the corresponding first or second indication.

28. The apparatus of claim 27, wherein: the first indication of the first geographical area and the second indication of the second geographical area are both included in a same request message.

29. The apparatus of claim 27, wherein: the request for edge information includes a first request message and a second request message, and wherein the first request message includes the first indication of the first geographical area and the second request message includes the second indication of the second geographical area.

30. The apparatus of claim 27, wherein the set of edge data network configurations includes connection information for a plurality of edge configuration servers including one or more of a first edge configuration server associated with the first geographic area, or a second edge configuration servers associated with the second geographic area.

31. The apparatus of claim 30, wherein the instructions are further executable by the processor to cause the apparatus to:
communicate with the first edge configuration server in the first geographical area;
determine that the UE has moved to the second geographical area; and
communicate, responsive to the determining, with the second edge configuration server.

32. The apparatus of claim 27, wherein the set of edge data network configurations includes information for a plurality of edge application server instances including one or more of a first edge application server instance associated with the first geographic area, or a second edge application server instance associated with the second geographic area.

33. The apparatus of claim 32, wherein the instructions are further executable by the processor to cause the apparatus to:
communicate with the first edge application server instance in the first geographical area;
determine that the UE has moved to the second geographical area; and
communicate, responsive to the determining, with the second edge application server instance.

34. The apparatus of claim 27, wherein the expected future location of the UE is based at least in part on one or more of a geographic point, a polygon associated with the UE location, a configured route of the UE, a signaling map of the UE, a waypoint set of the UE, or any combinations thereof.

35. The apparatus of claim 27, wherein the request for the edge data network information comprises a plurality of information elements, including at least a first information element for a geographical area of operation that indicates one or more geographical areas.

36. The apparatus of claim 27, wherein the geographical area of operation of each of the edge data network configuration is provided as one or more of a geographic point, a polygon, a portion of a configured route of the UE, a portion of a signaling map of the UE, a waypoint of a waypoint set of the UE, or any combinations thereof.

37. The apparatus of claim 27, wherein the edge server is part of a base station of the wireless communications network.

38. The apparatus of claim 27, wherein:
the request is generated at an edge enabler client at the UE and transmitted to an edge configuration server via an EDGE-4 interface provided by the wireless communications network; and
the one or more separate responses are received at the edge enabler client from the edge configuration server via the EDGE-4 interface.

39. The apparatus of claim 27, wherein:
the request is generated at an edge enabler client at the UE and transmitted to an edge enabler server via an EDGE-1 interface provided by the wireless communications network; and
the one or more separate responses are received at the edge enabler client from the edge enabler server via the EDGE-1 interface.

40. An apparatus for wireless communication at a network node of an edge data network, comprising:
a processor, memory coupled with the processor; and
instructions stored in the memory and executable by the processor to cause the apparatus to:
receive, from a user equipment (UE) via a wireless communications network, a request for edge information associated with adding a network service, the request including at least a first indication of a first geographical area in which the UE is currently located and a second indication of a second geographical area in which the UE is expected to be located in the future, wherein the second indication includes one or more indications different from the first indication; and
for each of the first indication and second indication, transmit, to the UE, one or more separate responses that each provides a set of edge data network configurations and, for each edge data network configuration, an associated geographical area of operation for the edge data network configuration for the corresponding first or second indication.

41. The apparatus of claim 40, wherein the first indication of the first geographical area and the second indication of the second geographical area are both included in a same request message.

42. The apparatus of claim 40, wherein the request for edge information includes a first request message and a second request message, and wherein the first request message includes the first indication of the first geographical area and the second request message includes the second indication of the second geographical area.

43. The apparatus of claim 40, wherein the set of edge data network configurations includes connection information for a plurality of edge configuration servers including one or more of a first edge configuration server associated with the first geographic area, or a second edge configuration servers associated with the second geographic area.

44. The apparatus of claim 43, wherein the instructions are further executable by the processor to cause the apparatus to:
configure the first edge configuration server and the second edge configuration server with context information of the UE.

45. The apparatus of claim 40, wherein the set of edge data network configurations includes information for a plurality of edge application server instances including one or more of a first edge application server instance associated with the first geographic area, or a second edge application server instance associated with the second geographic area.

46. The apparatus of claim 45, wherein the instructions are further executable by the processor to cause the apparatus to:
configure one or more of a first edge application server to provide the first edge application server instance for the UE, or a second edge application server to provide the second edge application server instance for the UE.

47. The apparatus of claim 40, wherein the expected future location of the UE is based at least in part on one or more of a geographic point, a polygon associated with the UE location, a configured route of the UE, a signaling map of the UE, a waypoint set of the UE, or any combinations thereof.

48. The apparatus of claim 40, wherein the request for edge information comprises a plurality of information elements, including at least a first information element for a geographical area of operation that indicates the one or more geographical areas.

49. The apparatus of claim 40, wherein the geographical area of operation of each of the edge data network configuration is provided as one or more of a geographic point, a polygon, a portion of a configured route of the UE, a portion of a signaling map of the UE, a waypoint of a waypoint set of the UE, or any combinations thereof.

50. The apparatus of claim 40, wherein the network node is part of a base station of the wireless communications network.

51. The apparatus of claim 50, wherein:
the request is generated at an edge enabler client at the UE and received at an edge configuration server via an EDGE-4 interface provided by the wireless communications network; and
the one or more separate responses are transmitted to the edge enabler client from the edge configuration server via the EDGE-4 interface.

52. The apparatus of claim 50, wherein:
the request is generated at an edge enabler client at the UE and received at an edge enabler server via an EDGE-1 interface provided by the wireless communications network; and
the one or more separate responses are transmitted to the edge enabler client from the edge enabler server via the EDGE-1 interface.

53. An apparatus for wireless communication at a user equipment (UE), comprising:
means for transmitting, via a wireless communications network to an edge server of an edge data network, a request for edge information associated with adding a network service, the request including at least a first indication of a first geographical area in which the UE is currently located and a second indication of a second geographical area in which the UE is expected to be located in the future, wherein the second indication includes one or more indications different from the first indication; and
for each of the first indication and second indication, means for receiving, from the edge server, one or more separate responses that each provides a set of edge data network configurations and, for each edge data network configuration, an associated geographical area of operation for the edge data network configuration for the corresponding first or second indication.

54. An apparatus for wireless communication at a network node of an edge data network, comprising:

means for receiving, from a user equipment (UE) via a wireless communications network, a request for edge information associated with adding a network service, the request including at least a first indication of a first geographical area in which the UE is currently located and a second indication of a second geographical area in which the UE is expected to be located in the future, wherein the second indication includes one or more indications different from the first indication; and
for each of the first indication and second indication, means for transmitting, to the UE, one or more separate responses that each provides a set of edge data network configurations and, for each edge data network configuration, an associated geographical area of operation for the edge data network configuration for the corresponding first or second indication.

55. A non-transitory computer-readable medium storing code for wireless communication at a user equipment (UE), the code comprising instructions executable by a processor to:
transmit, via a wireless communications network to an edge server of an edge data network, a request for edge information associated with adding a network service, the request including at least a first indication of a first geographical area in which the UE is currently located and a second indication of a second geographical area in which the UE is expected to be located in the future, wherein the second indication includes one or more indications different from the first indication; and
for each of the first indication and second indication, receive, from the edge server, one or more separate responses that each provides a set of edge data network configurations and, for each edge data network configuration, an associated geographical area of operation for the edge data network configuration for the corresponding first or second indication.

56. A non-transitory computer-readable medium storing code for wireless communication at a network node of an edge data network, the code comprising instructions executable by a processor to:
receive, from a user equipment (UE) via a wireless communications network, a request for edge information associated with adding a network service, the request including at least a first indication of a first geographical area in which the UE is currently located and a second indication of a second geographical area in which the UE is expected to be located in the future, wherein the second indication includes one or more indications different from the first indication; and
for each of the first indication and second indication, transmit, to the UE, one or more separate responses that each provides a set of edge data network configurations and, for each edge data network configuration, an associated geographical area of operation for the edge data network configuration for the corresponding first or second indication.

\* \* \* \* \*